US006943918B1

(12) United States Patent
Kakutani

(10) Patent No.: US 6,943,918 B1
(45) Date of Patent: *Sep. 13, 2005

(54) PRINTER-SYSTEM, METHOD OF PRINTING, AND RECORDING MEDIUM FOR IMPLEMENTING THE METHOD

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/339,959

(22) Filed: Jun. 25, 1999

(30) Foreign Application Priority Data

Jun. 26, 1998 (JP) ................................. 10-196793

(51) Int. Cl.[7] ........................ H04N 1/405; H04N 1/409
(52) U.S. Cl. ................... 358/3.02; 358/3.03; 358/3.12; 358/3.24; 358/3.26
(58) Field of Search ...................... 358/1.9, 456, 465, 358/298, 447, 3.06, 3.1, 3.2, 3.22, 3.02, 3.01, 358/3.12, 3.23–3.24, 3.26–3.27; 347/15

(56) References Cited

U.S. PATENT DOCUMENTS

| 5,045,952 | A | * | 9/1991 | Eschbach ..................... 358/447 |
| 5,077,615 | A | * | 12/1991 | Tsuji ........................... 358/3.1 |
| 5,600,764 | A | * | 2/1997 | Kakutani ..................... 345/591 |
| 5,648,801 | A | * | 7/1997 | Beardsley et al. ............ 347/15 |
| 5,748,336 | A | * | 5/1998 | Kakutani ..................... 382/252 |
| 5,880,857 | A | * | 3/1999 | Shiau et al. ................ 358/3.03 |
| 6,089,691 | A | * | 7/2000 | Kakutani ..................... 347/15 |
| 6,099,105 | A | * | 8/2000 | Kakutani ..................... 347/15 |
| 6,215,561 | B1 | * | 4/2001 | Kakutani ..................... 358/1.9 |
| 6,328,400 | B1 | * | 12/2001 | Yonekubo et al. ............ 347/15 |
| 6,338,538 | B1 | * | 1/2002 | Toshiaki ..................... 347/15 |
| 6,382,757 | B1 | * | 5/2002 | Kakutani ..................... 347/15 |
| 6,439,682 | B1 | * | 8/2002 | Kakutani ..................... 347/15 |
| 6,443,548 | B1 | * | 9/2002 | Takayama et al. ............ 347/14 |
| 6,543,870 | B1 | * | 4/2003 | Kakutani ..................... 347/15 |
| 6,563,604 | B1 | * | 5/2003 | Morimatsu et al. ........ 358/3.09 |
| 6,563,957 | B1 | * | 5/2003 | Li et al. ..................... 382/252 |
| 6,602,003 | B2 | * | 8/2003 | Kakutani ..................... 400/76 |

FOREIGN PATENT DOCUMENTS

| EP | 0 414 505 | 2/1991 | |
| EP | 0 715 451 | 6/1996 | |
| EP | 0 820 187 | 1/1998 | |
| EP | 820187 A2 * | 1/1998 | ............ H04N 1/52 |
| JP | 59-201864 | 11/1984 | |
| JP | 3-50960 | 3/1991 | |
| WO | WO 98/03341 | 1/1998 | |

(Continued)

Primary Examiner—Scott A. Rogers
(74) Attorney, Agent, or Firm—Oblon, Spivak, McClelland, Maier & Neustadt, P.C.

(57) ABSTRACT

A printer-system for printing or recording images using a plurality of dots having different densities. The printer system includes a head for producing at least 2 different types of dots having different densities per unit area, an input unit for receiving input tone data with respect to each of the pixels in an original image, a threshold value storage unit for storing threshold values, a multi-valuing unit for determining the on-off state of a dot and the type of the dot to be created at each pixel, and a dot creation unit for driving the printer head. Print image quality is degraded for example when, around any specific input tone value, there are abrupt changes in the number density of large dots to small dots. The multi-valuing unit, employing error diffusion techniques, changes the threshold values for selecting the type of dot printed to control the relative density of large dots at each input tone value and thus regulates the print image quality.

15 Claims, 17 Drawing Sheets

PRINTER-SYSTEM, METHOD OF PRINTING, AND RECORDING MEDIUM FOR IMPLEMENTING THE METHOD

CROSS-REFERENCE TO RELATED APPLICATIONS

This application claims priority under 35 USC §119 to Japanese Patent No. 10-196793 filed Jun. 26, 1998; the entire contents of which is incorporated herein by reference.

BACKGROUND OF THE INVENTION

1. Field of the Invention

The present invention relates to a printer system that prints a multi-tone image with a head, which enables at least two different types of dots having different density evaluation values, which represent densities per unit area and vary in a stepwise manner, to be created with respect to at least one hue. The present invention also pertains to a method of printing as well as a recording medium for implementing the method.

2. Description of the Background

Color printers that eject multiple colors of inks from a head (ink jet printers) are widely used as an output device of a computer, which prints images processed by the computer in a multi-color, multi-tone manner. In the ink jet printer, the tone corresponding to input tone data is expressed by regulating the creation ratio of dots in each area.

The error diffusion method is one of the methods that regulate creation of a dot in each pixel based on the above idea. The error diffusion method diffuses an error, which occurs in each target pixel due to a discrepancy between the density to be expressed in the pixel by the input tone data and the density expressed by a dot actually created in the pixel, into peripheral non-processed pixels in the vicinity of the target pixel. Such error diffusion results in regulating creation of dots, in order to minimize the density error in a resulting image as a whole. Correction data, which is obtained by making the diffused errors reflect on the input tone data, i.e. errors are distributed into adjacent unprocessed pixels, is used to determine creation or non-creation of a dot in each pixel.

A variety of techniques have recently been proposed to enrich the tone expression in ink jet printers. One of such techniques is a printer using inks of different densities and a corresponding method of printing (for example, JAPANESE PATENT APPLICATION No. 8-209232). This technique provides a higher-density ink and a lower-density ink with respect to an identical hue and regulates ejection of these inks, in order to attain the printing with excellent tone expression.

Another proposed technique for attaining the multi-tone expression is a printer that creates two different types of dots having different ink densities and different dot diameters and thereby varies the density per unit area in multiple stages (for example, JAPANESE PATENT LAID-OPEN GAZETTE No. 59-201864). In this printer, one pixel consists of four dots. The technique changes the frequency of the appearance of the dots having the higher density and the dots having the lower density in each pixel, so as to enable an image to be printed in multiple densities.

These proposed techniques do not carry out the two-valuing process, that is, the simple on-off determination of dots, with respect to each hue, but implement the three-valuing or another multi-valuing process with various types of dots having the different densities or different dot diameters, in order to attain the multi-tone expression.

The error diffusion method significantly reduces the density error in a resulting image as a whole and improves the picture quality of the resulting image, compared with other methods that regulate creation of dots. The error diffusion method is accordingly advantageous for the two-valuing process. It has been proved, however, that the three-valuing process according to the error diffusion method can not regulate the creation ratio of dots to a desired value. An example of such results is shown in the graph of FIG. 14.

The graph of FIG. 14 shows a creation ratio plotted against the input tone value in the range of 0 to 255. The creation ratio of the greater diameter dots (hereinafter referred to as the large dots) to the total number of dots including also the smaller diameter dots (hereinafter referred to as the small dots) was determined by extending the error diffusion method to the three-valuing process, where threshold values were set to fixed values '64' and '94', a density evaluation value of the small dot to 128, and a density evaluation value of the large dot to 255. In the event that correction data, which was obtained by making the diffused errors reflect on the input tone value, was smaller than the value '64', it was determined that no dot was to be created. In the event that the correction data was not smaller than the value '64' but was smaller than the value '94', it was determined that a small dot was to be created. In the event that the correction data was not smaller than the value '94', it was determined that a large dot was to be created. After the determination of creation or non-creation of a dot in a certain target pixel, the process diffused a density error, that is, a difference between the density evaluation value of the dot actually created in the pixel and the density to be expressed in the pixel by the input tone value, into peripheral pixels and carried out the processing for a next target pixel. The proportion of the error diffusion into the peripheral pixels is not essential, and the description is omitted here.

As clearly shown in FIG. 14, the creation ratio of the large dots obtained as a result of the above process generally shows an increasing tendency according to the input tone value, but does not change smoothly and has some extreme points. At some of these extreme points, the creation ratio of the large dots abruptly changes (for example, points p and q in FIG. 14). Even if the density corresponding to the input tone value is expressed in a resulting image as a whole, the expression with a small number of large dots and the expression with a large number of small dots have the different visual effects. The large dots generally have a higher visual recognition then the small dots. The frequent appearance of the large dots thus undesirably increases the harshness of the resulting image. At specific input tone values where the creation ratio of the large dots significantly changes, for example, the points p and q in FIG. 14, the resulting picture quality is different from the picture quality in a peripheral image area. This effect may result in the occurrence of a quasi contour.

SUMMARY OF THE INVENTION

Accordingly, one object of the present invention is to provide a novel technique that regulates the creation ratio of different types of dots having different densities per unit area to a desired value according to the input tone value and thereby improves the picture quality of a resulting printed image in a printer that carries out a three-valuing process or another multi-valuing process according to the error diffusion method.

At least part of the above and the other related objects is attained by a first printer-system that creates a plurality of dots and thereby prints an image on a printing medium. The first printer-system includes: a head that enables creation of N different types of dots having different densities per unit area, where N is an integer of not less than 2; an input unit that inputs tone data with respect to each of pixels included in an original image; a threshold value storage unit that stores a plurality of threshold values according to possible tone values that the input tone data may take, the threshold values including corresponding threshold values that correspond to P different types of dots, where P is an integer satisfying $2 \leq P \leq N$; a multi-valuing unit that determines an on-off state of a dot and a type of the dot to be created in each pixel, based on density data obtained by error diffusion distribution of an error representing a difference between a density to be expressed in a processed pixel and a density expressed by a dot actually created in the pixel into unprocessed pixels; and a dot creation unit that drives the head and creates the N different types of dots having different densities per unit area, based on results of the determination.

In the first printer-system of the present invention, the corresponding threshold values relating to the creation of the P different types of dots (where P is an integer satisfying $2 \leq P \leq N$) among the N different types of dots having different densities per unit area (where N is an integer of not less than 2) are not set to fixed values over a whole range of tone values, but are changed according to the tone value. This arrangement enables the creation ratio of these P different types of dots to be regulated, and prevents an abrupt change of the creation ratio of the dots, which may result in the occurrence of a quasi contour. Compared with the technique that determines creation or non-creation of dots with fixed threshold values, the technique of the present invention improves the picture quality of the resulting printed image. The threshold values may be changed continuously or stepwise against the tone value. The change may have a fixed tendency, such as a monotonous increase or a monotonous decrease, or may alternatively have both an increasing portion and a decreasing portion.

The N different types of dots having different densities per unit area (where N is an integer of not less than 2) do not include the dot having the area equal to zero, that is, the non-creation state of a dot. Namely (N+1) different densities, which are the sum of the N creation states in which the N different types of dots are respectively created and the non-creation state of a dot, are expressible with respect to each pixel. In other words, there are N different threshold values that affect creation of a dot in each pixel. The dots having different densities per unit area may be created with inks of different densities with respect to a certain hue or may be created by different quantities of ink spouted in the respective pixels. In the latter case, the quantity of ink spouted each time or the number of ink spouts in the respective pixels may be different.

In accordance with one preferable application of the first printer-system, the corresponding threshold values are set to cause a creation ratio of the P different types of dots to smoothly change against the tone value.

Setting the corresponding threshold values in the above manner enables the creation ratio of the P different types of dots to smoothly change and effectively prevents the occurrence of a quasi contour, thereby improving the picture quality of the resulting printed image. The creation ratio of dots may be a ratio of the numbers of the respective dots created in a specific area or may be a ratio of any one of various parameters that depend upon the ratio of dots and have visual effects.

For example, the creation ratio may represent a ratio of a density expressed by a specific dot, which is selected out of the P different types of dots and created in a certain tone range, to a density to be expressed by the input tone data.

In the first printer-system of the present invention, part of the corresponding threshold values may be set to an identical value in a specified tone range. In this specified tone range, one among the plurality of different types of dots has a creation ratio equal to zero.

In the first printer-system of the present invention, a difference betveen the corresponding threshold values may have a plurality of turning values according to the input tone value.

By way of example, when the threshold values are fixed irrespective of the tone value, the creation ratio of dots has a plurality of extreme points as shown in FIG. 14. On the contrary, the technique of setting the corresponding threshold values to have a plurality of turning values yields a creation ratio of dots which is regulated to have no such extreme points, and the creation ratio varies smoothly.

In accordance with one preferable application of the first printer-system, the head enables creation of two different types of dots having different ink quantities and the corresponding threshold values include a greater threshold value and a smaller threshold value.

The creation ratio of two different types of dots having different ink quantities visually affects the harshness of the resulting printed image. It is accordingly effective to regulate the creation ratio of the two different types of dots in such a manner that ensures its smooth change.

In the first printer-system of the present invention, the creation ratio may take significant values only in a continuous tone range, which is part of the possible tone values that the input tone data may take.

In a low tone area, there is little necessity of using dots having the higher density per unit area. It is accordingly effective to regulate the creation ratio of dots only in a specific area that requires the dots having the higher density per unit area.

In the first printer-system of the above structure, a creation ratio in the lower limit of the continuous tone range is set to be different from specific tone values, at which the creation ratio of the P different types of dots would abruptly change if the corresponding threshold values were set to fixed values irrespective of the tone value.

In the event that the corresponding threshold values are set to fixed values, the creation ratio of dots drastically varies at some tone values as shown in FIG. 14. At these tone values, the creation ratio of dots abruptly changes in response to only a slight change of the tone value. These tone values are extremely unstable from the view point of the picture quality. The printer-system of the above structure avoids such tone values in the process of regulating the creation ratio of dots, thereby enabling the creation ratio of dots to be stably and appropriately regulated.

Thus, while the prior art technique can not appropriately regulate according to the error diffusion method the creation ratio of the respective dots when the three-valuing or another multi-valuing process is carried out on a printer which has a head that enables creation of N different types of dots, N not less than 2, the multi-valuing process of the present invention employing error diffusion changes threshold values according to the tone value of input data thereby to regulate the creation ratio of the respective dots. The approximate settings of these threshold values are consecutively refined, in order to cause the creation ratio of the respective dots to coincide with a desired value. When the multi-valuing process is carried out with the refined threshold values set according to the tone value, the creation ratio of the respective dots smoothly changes with the input tone values. This technique effectively prevents the occurrence of a quasi contour and improves the picture quality of a resulting printed image.

The present invention is also directed to a second printer-system that creates a plurality of dots and thereby prints an image on a printing medium. The second printer-system includes: a head that enables creation of N different types of dots having different densities per unit area, where N is an integer of not less than 2; an input unit that inputs tone data with respect to each of pixels included in an original image; a multi-valuing unit that determines an on-off state of a dot and a type of the dot to be created in each pixel, based on density data obtained by error diffusion distribution of an error representing a difference between a density to be expressed in a processed pixel and a density expressed by a dot actually created in the pixel into unprocessed pixels; a dot creation unit that drives the head and creates the N different types of dots having different densities per unit area, based on results of the determination; and a noise addition unit that adds preset noise data to either one of the input tone data or at least part of the plurality of threshold values, prior to the determination by the multi-valuing unit.

The second printer-system of the present invention ensures an improvement in picture quality of the resulting printed image even when fixed threshold values are used for the multi-valuing of dots. Addition of preset noise data to the tone data or the threshold values enables the tone values in the vicinity of the input tone data to be used in a substantially equalized manner. This arrangement causes the creation ratio of dots having extreme points as shown in FIG. 14 to be equalized and smoothly change, thereby improving the picture quality of the resulting printed image. Since the mean of the noise data is equal to zero, the input tone data does not have any significant error.

In accordance with one preferable application of the second printer-system, the noise addition unit adds the preset noise data only when the input tone data coincides with a predetermined tone value. The predetermined tone value used in the noise addition unit is set equal to a specific tone value, at which a creation ratio of P different types of dots abruptly changes, where P is an integer satisfying $2 \leq P \leq N$.

In the second printer-system of this application, the preset noise data is added, for example, only at specific tone values where the creation ratio of dots abruptly changes as shown in FIG. 14. This arrangement relieves the change of the creation ratio of dots at such specific tone values and thereby improves the picture quality of the resulting printed image.

In accordance with another preferable application of the second printer-system, the noise addition unit adds first noise data to either one of the input tone data or at least part of the plurality of threshold values, prior to the determination by the multi-valuing unit. The noise addition unit adds second noise data, which has a greater absolute value than the first noise data, instead of the first noise data when the input tone value coincides with a predetermined tone value.

In the second printer-system of this structure, addition of noise data in all the cases ensures a smooth change of the creation ratio of dots. Addition of larger noise data at the specific tone values further ensures a smoother change of the creation ratio of dots at and about the specific tone values, thereby improving the picture quality of the resulting printed image.

One possible application of the present invention other than ink-jet printing is a method of printing. Another possible application of the present invention is a recording medium, in which a program used for driving the printer having any one of the arrangements discussed above is recorded.

Typical examples of the recording media include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media. Still another application of the invention is a program supply apparatus that supplies the program to the computer via a communications path. In this case, the program for driving the printer may be supplied collectively as a whole or in the unit of each module.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DESCRIPTION OF THE PREFERRED EMBODIMENTS

Figure 1:
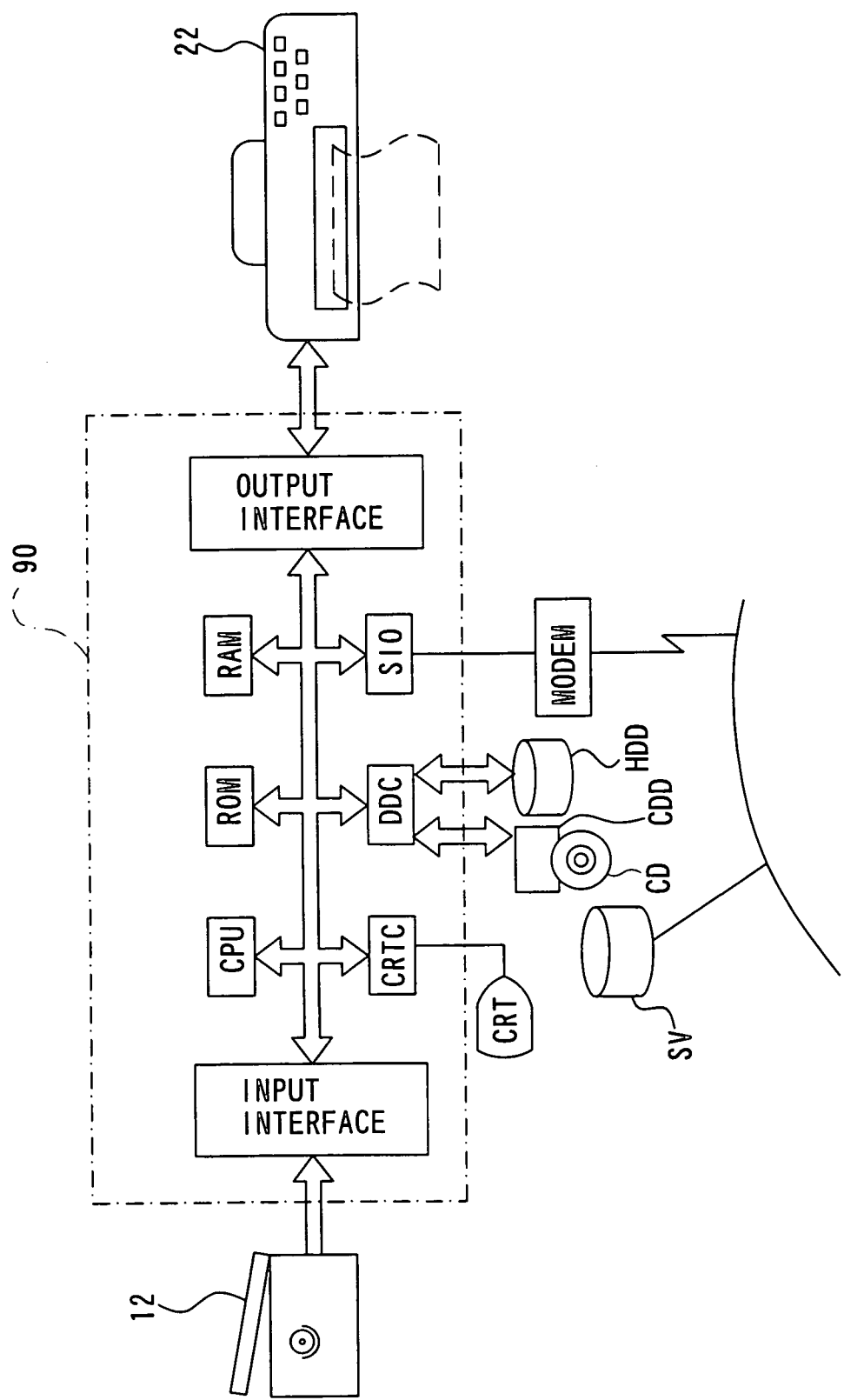
FIG. 1 is a block diagram illustrating the structure of a printing system including a printer 22 embodying the present invention.

Referring now to the drawings, wherein like reference numerals designate identical or corresponding parts throughout the several views, and more particularly to FIG. 1 thereof, the printing system includes a computer 90 connected to a scanner 12 and a color printer 22 as illustrated in FIG. 1. The computer 90 reads a program required for driving the printer 22 from a CD-ROM drive CDD or a flexible disk drive (not shown). The computer 90 is connected to an external network via a modem and can download a program required for driving the printer 22 from a specific server SV into a hard disk HDD.

Figure 2:
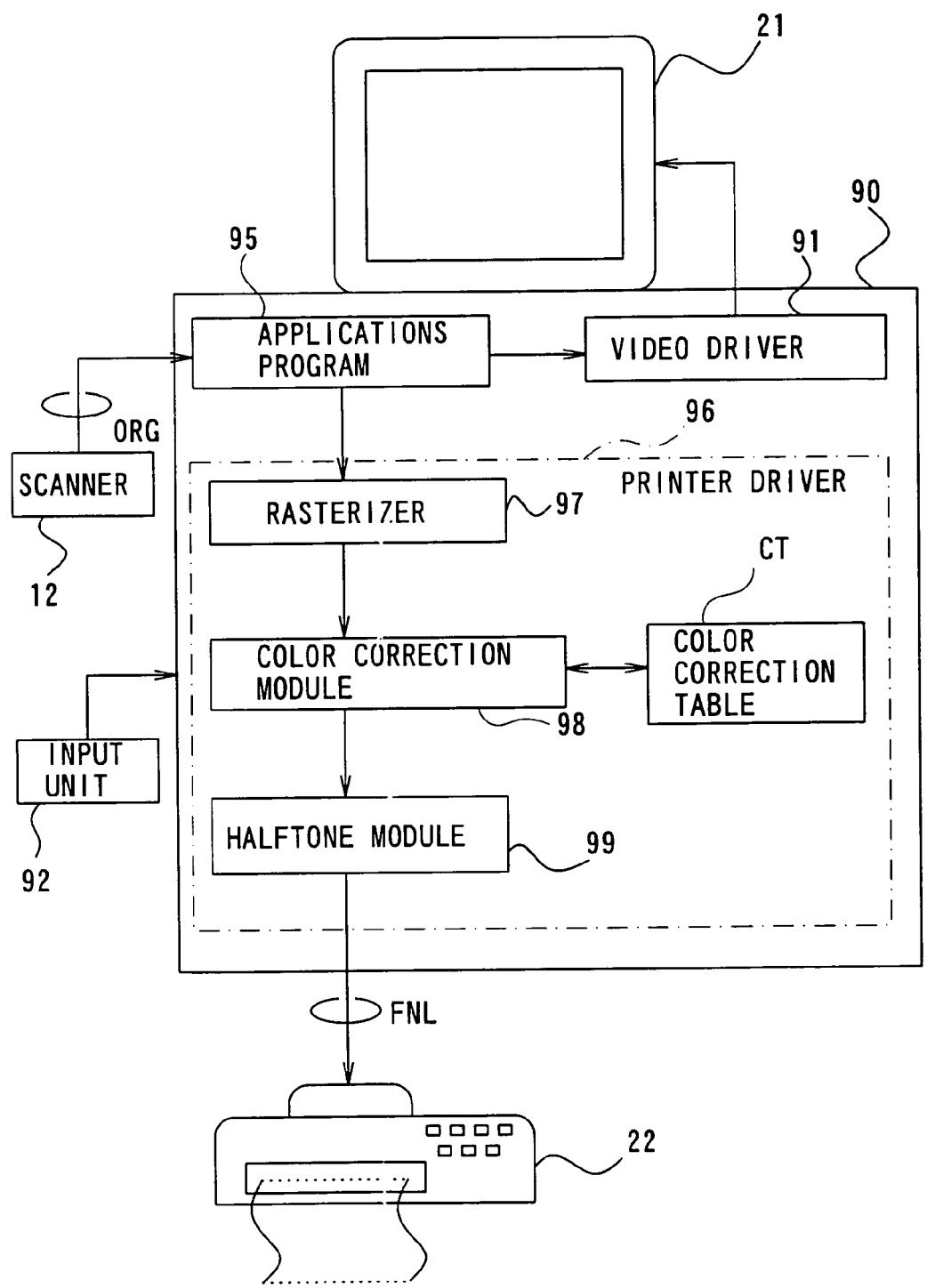
FIG. 2 is a functional block diagram illustrating the respective functions of image processing.

The computer includes a CPU, a RAM, and a ROM and executes an applications program 95 shown in FIG. 2 under a specific operating system. FIG. 2 is a functional block diagram illustrating the respective functions of image processing. The computer 90 has a color display 21 and an input device 92 including a keyboard and a mouse. The scanner 12 reads color image data from a color original and outputs the color image data as original color image data ORG, which consists of three color components, red (R), green (G), and blue (B), to the computer 90. The applications program 95, which implements required image processing, such as retouching of images, reads an image from the scanner 12, causes the input image to be subjected to the required image processing, and displays the processed image on a CRT display 21 via a video driver 91.

A printer driver 96 other than the video driver 91 discussed above is incorporated into the operating system. When the applications program 95 issues an instruction of printing, the printer driver 96 receives image information from the applications program 95 and converts the input image information into signals FNL printable by the printer 22 (in this embodiment, binarized signals with respect to four colors, cyan, magenta, yellow, and black). In the example of FIG. 2, the printer driver 96 includes a rasterizer 97 that converts the color image data processed by the applications program 95 into dot-unit image data, that is, image data in the unit of each dot, a color correction module 98 that carries out color correction according to the ink colors used by and the characteristics of the color development of the printer 22, a color correction table CT referred to by the color correction module 98, and a halftone module 99 that generates halftone image information, which expresses the density of a certain area as creation or non-creation of dots based on the image information after the color correction. The printer 22 receives the print signals FNL and records an image corresponding to the image information given in the form of the print signals FNL on a printing medium.

Figure 3:
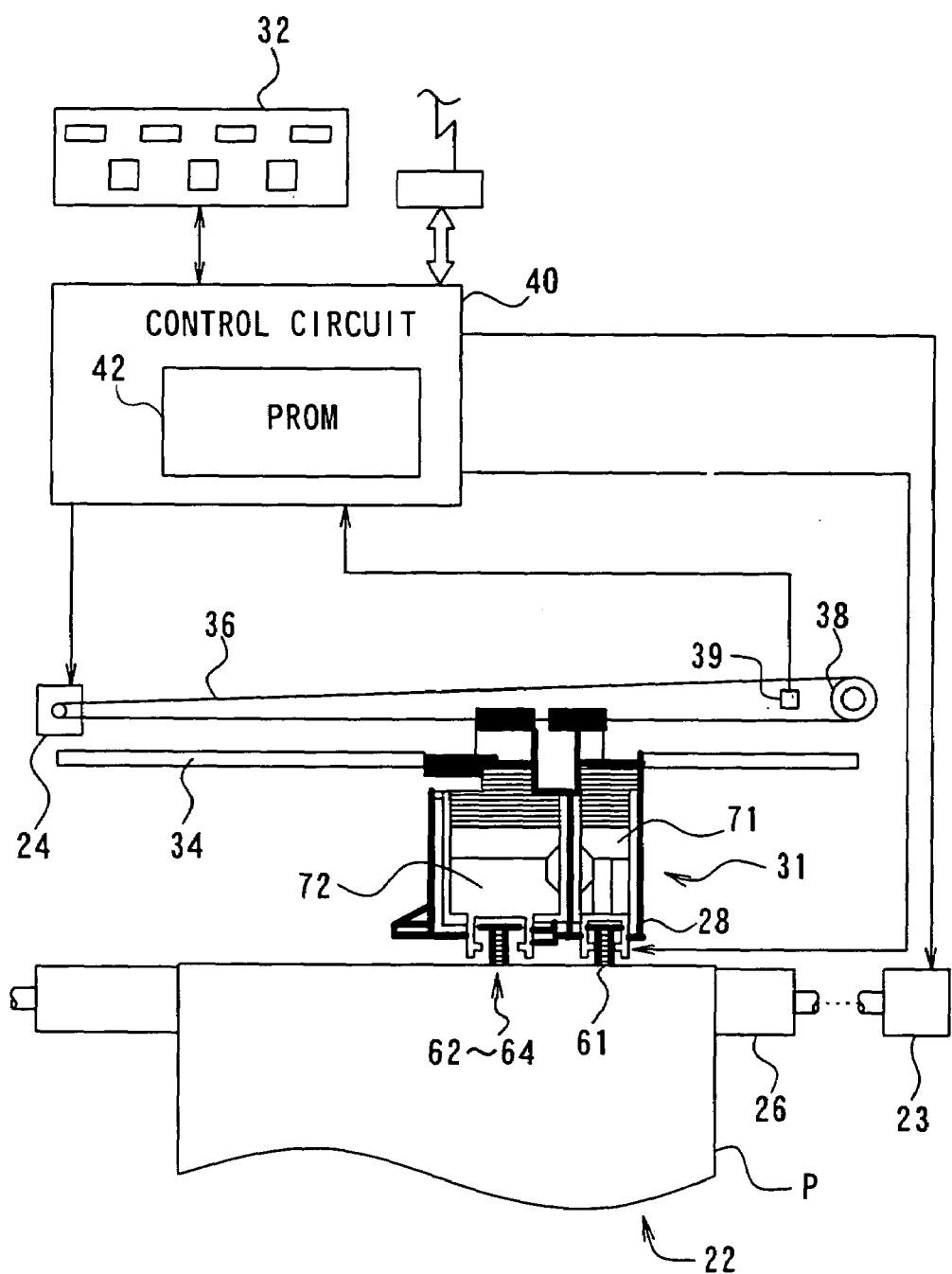
FIG. 3 schematically illustrates the structure of the printer 22.

The schematic structure of the printer 22 used in this embodiment is described with the drawing of FIG. 3. As illustrated in FIG. 3, the printer 22 has a mechanism for causing a sheet feed motor 23 to feed a sheet of printing paper P, a mechanism for causing a carriage motor 24 to move a carriage 31 forward and backward along an axis of a platen 26, a mechanism for driving a print head 28 mounted on the carriage 31 to control the ejection of ink and creation of dots, and a control circuit 40 that controls transmission of signals to and from the sheet feed motor 23, the carriage motor 24, the print head 28, and a control panel 32.

A black ink cartridge 71 for black ink (Bk) and a color ink cartridge 72 in which three color inks, that is, cyan (C), magenta (M), and yellow (Y), are accommodated may be mounted on the carriage 31 of the printer 22. A total of four ink spout heads 61 through 64 are formed on the print head 28 that is disposed in the lower portion of the carriage 31, and ink supply conduits 67 (see FIG. 4) are arranged upright in the bottom portion of the carriage 31 for leading supplies of inks from ink tanks to the respective ink spout heads 61 through 64. When the black ink cartridge 71 and the color ink cartridge 72 are attached downward to the carriage 31, the ink supply conduits 67 are inserted into connection apertures (not shown) formed in the respective ink cartridges 71 and 72. This enables supplies of inks to be fed from the respective ink cartridges 71 and 72 to the ink spout heads 61 through 64.

Figure 4:
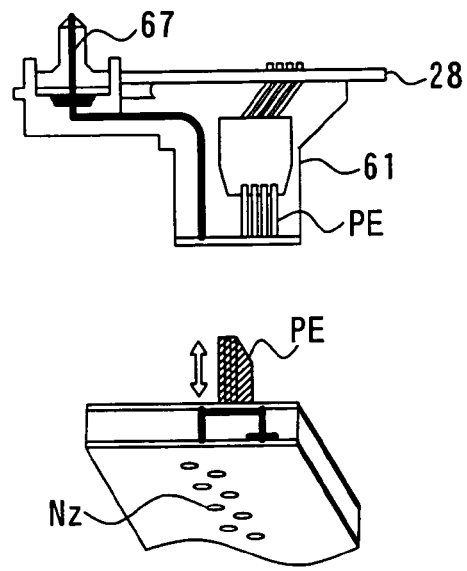
FIG. 4 schematically illustrates the internal structure of a print head in the printer 22.

The following briefly describes the mechanism of ejecting ink. FIG. 4 schematically illustrates the internal structure of the print head 28. When the ink cartridges 71 and 72 are attached to the carriage 31, supplies of inks in the ink cartridges 71 and 72 are sucked out by capillarity through the ink supply conduits 67 and are led to the ink spout heads 61 through 64 formed in the print head 28 arranged in the lower portion of the carriage 31 as shown in FIG. 4. In the case where the ink cartridges 71 and 72 are attached to the carriage 31 for the first time, a pump works to suck first supplies of inks into the respective ink spout heads 61 through 64. In this embodiment, structures of the pump for suction and a cap for covering the print head 28 during the suction are not illustrated nor described specifically.

Figure 5:
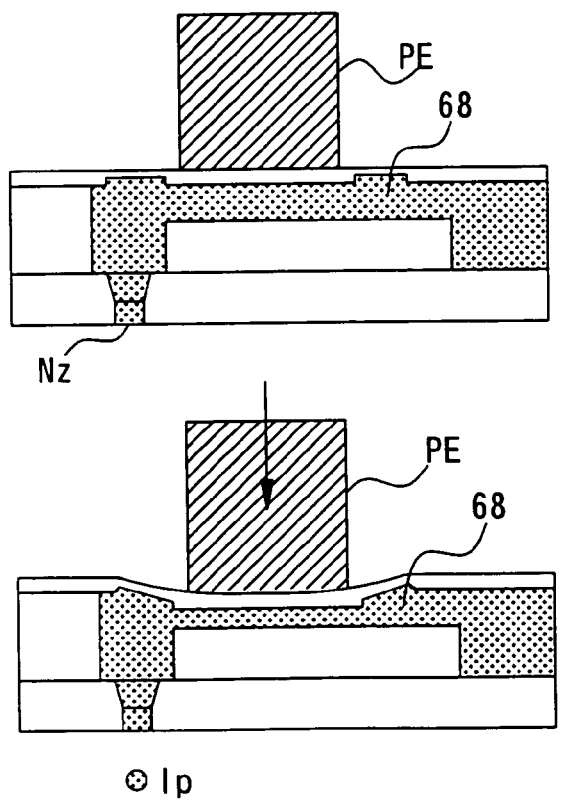
FIG. 5 shows the principle of dot creation in the printer 22.

An array of thirty-two nozzles Nz (see FIG. 7) is formed in each of the ink spout heads 61 through 64 as discussed later. A piezoelectric element PE, which is one of electrically distorting elements and has an excellent response, is arranged for each nozzle Nz. FIG. 5 illustrates a configuration of the piezoelectric element PE and the nozzle Nz. As shown in the upper drawing of FIG. 5, the piezoelectric element PE is disposed at a position that comes into contact with an ink conduit 68 for leading ink to the nozzle Nz. As is known by those skilled in the art, the piezoelectric element PE has a crystal structure that is subjected to mechanical stress due to application of a voltage and thereby carries out extremely high-speed conversion of electrical energy into mechanical energy. In this embodiment, application of a voltage between electrodes on both ends of the piezoelectric element PE for a predetermined time period causes the piezoelectric element PE to extend for the predetermined time period and deform one side wall of the ink conduit 68 as shown in the lower drawing of FIG. 5. The volume of the ink conduit 68 is reduced with an extension of the piezoelectric element PE, and a certain amount of ink corresponding to the reduced volume is ejected as an ink particle Ip from the end of the nozzle Nz at a high speed. The ink particles Ip soak into the sheet of paper P set on the platen 26, so as to implement printing.

In the printer 22 of the embodiment having the hardware structure discussed above, while the sheet feed motor 23 rotates the platen 26 and the other related rollers to feed the sheet of paper P (hereinafter referred to es the sub-scan), the carriage motor 24 drives and reciprocates the carriage 31 (hereinafter referred to as the main scan), simultaneously with actuation of the piezoelectric elements PE on the respective ink spout heads 61 through 64 of the print head

28. The printer 22 accordingly sprays the respective color inks to create dots and thereby forms a multi-color image on the sheet of paper P.

The mechanism for feeding the sheet of paper P has a gear train (not shown) that transmits rotations of the sheet feed motor 23 to the platen 26 as well as a sheet feed roller (not shown). The mechanism for reciprocating the carriage 31 includes a sliding shaft 34 arranged in parallel with the axis of the platen 26 for slidably supporting the carriage 31, a pulley 38, an endless drive belt 36 spanned between the carriage motor 24 and the pulley 38, and a position sensor 39 that detects the position of the origin of the carriage 31.

Figure 6:
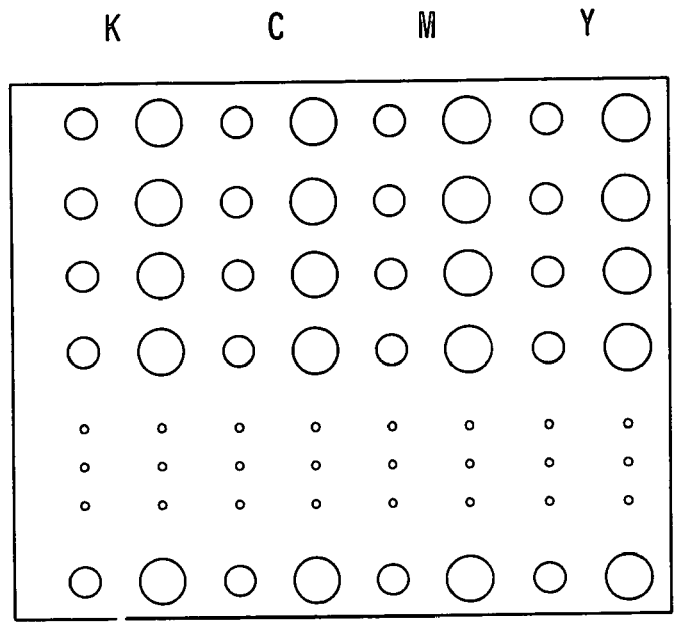
FIG. 6 shows a possible arrangement of nozzles in the printer 22.
Figure 7:
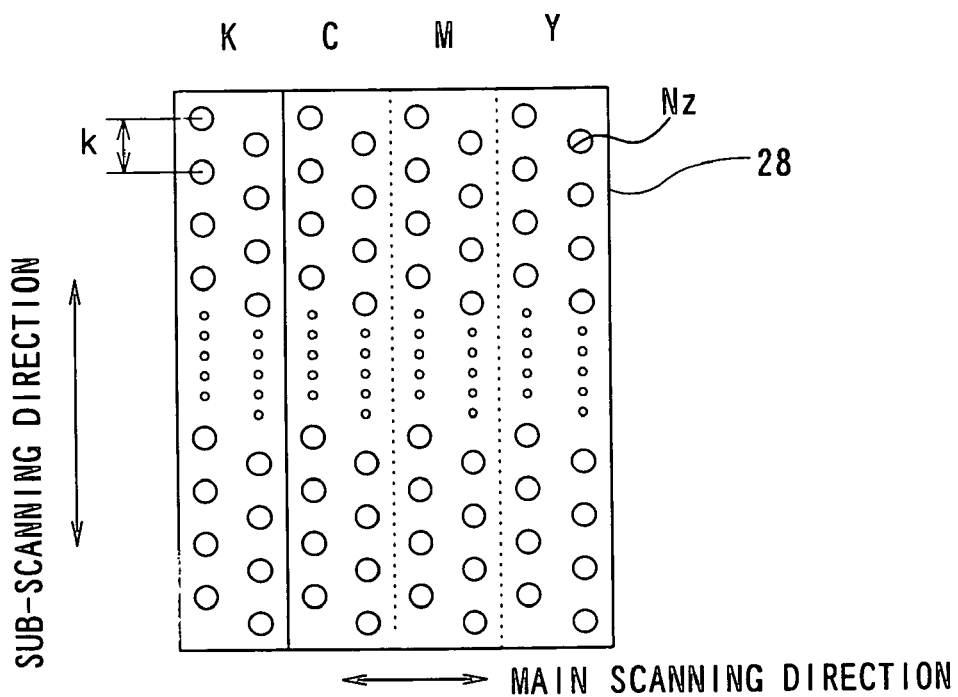
FIG. 7 shows another possible arrangement of nozzles in the printer 22.

FIGS. 6 and 7 show possible arrangements of the ink jet nozzles Nz in the ink spout heads 61 through 64. The printer 22 of this embodiment may create three different types of dots having different dot diameters, large, medium, and small, with respect to each color and uses two different types of dots, large and small, among these options. A structure that provides nozzles of different diameters for each color as shown in FIG. 6 may be applied to create the dots having different dot diameters. This embodiment, however, adopts the structure of FIG. 7 that provides nozzles of a fixed diameter and creates the dots having different dot diameters according to a control procedure discussed below. The arrangement of nozzles shown in FIG. 7 includes four nozzle arrays, wherein each nozzle array ejects ink of each color and includes thirty-two nozzles Nz arranged in zigzag at a fixed nozzle pitch k. The positions of the nozzles in the sub-scanning direction are identical in the respective nozzle arrays. The thirty-two nozzles Nz included in each nozzle array may be arranged in alignment, instead of in zigzag. The zigzag arrangement shown in FIG. 7, however, allows a small value to be set to the nozzle pitch k in the manufacturing process.

Figure 8:
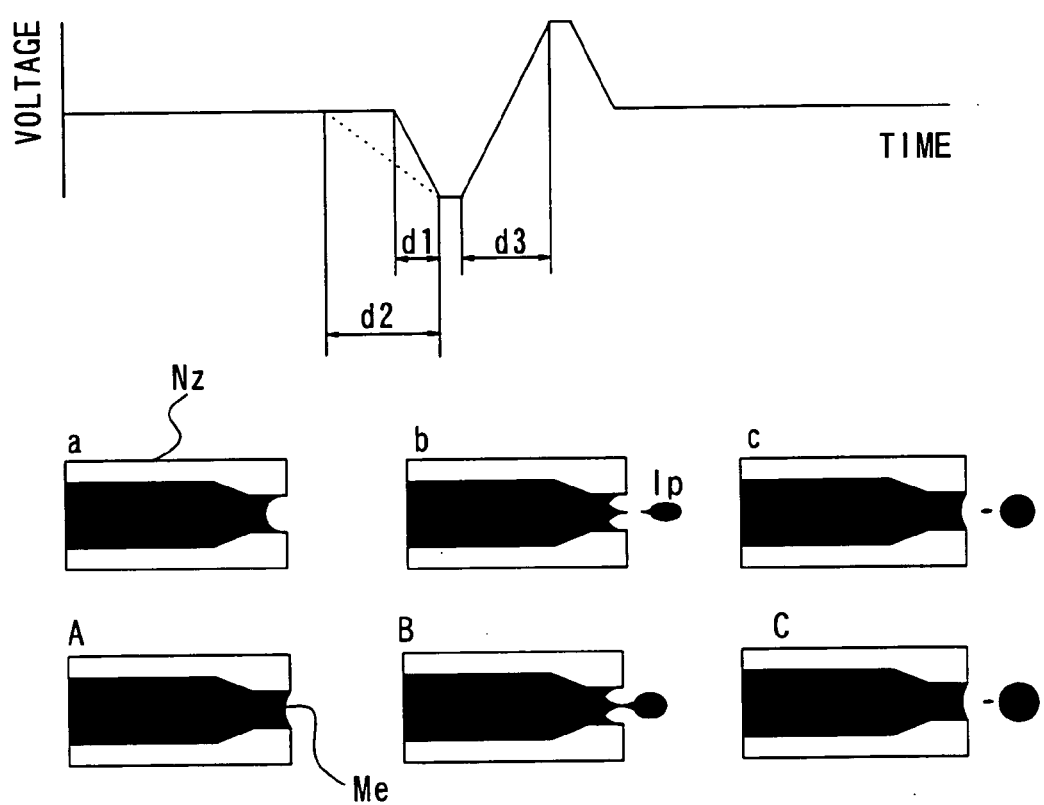
FIG. 8 shows the principle of creating dots having different dot diameters in the printer 22.

The printer 22 can create the three different types of dots having different dot diameters with the head including the nozzles of a fixed diameter. The following describes the principle of such dot creation technique. FIG. 8 shows the relationship between the driving waveform of the nozzle Nz and the size of the ink particle Ip ejected from the nozzle Nz. The driving waveform shown by the broken line in FIG. 8 is used to create standard-sized dots. A decrease in voltage applied to the piezoelectric element PE in a time division d2 deforms the piezoelectric element PE in the direction of increasing the cross section of the ink conduit 68, contrary to the case discussed previously with the drawing of FIG. 5. As shown in a state A of FIG. 8, an ink interface Me, which is generally referred to as meniscus, is thus slightly concaved inward the nozzle Nz. When the driving waveform shown by the solid line in FIG. 8 is used to abruptly lower the voltage in a time division d1, on the other hand, the meniscus is more significantly concaved inward the nozzle Nz as shown in a state 'a', compared with the state A. A subsequent increase in voltage applied to the piezoelectric element PE in a time division d3 causes the ink to be ejected, based on the principle described previously with the drawing of FIG. 5. As shown in states B and C, a large ink droplet is ejected when the meniscus is only slightly concaved inward (state A). As shown in states 'b' and 'c', on the other hand, a small ink droplet is ejected when the meniscus is significantly concaved inward (state 'a').

Figure 9:
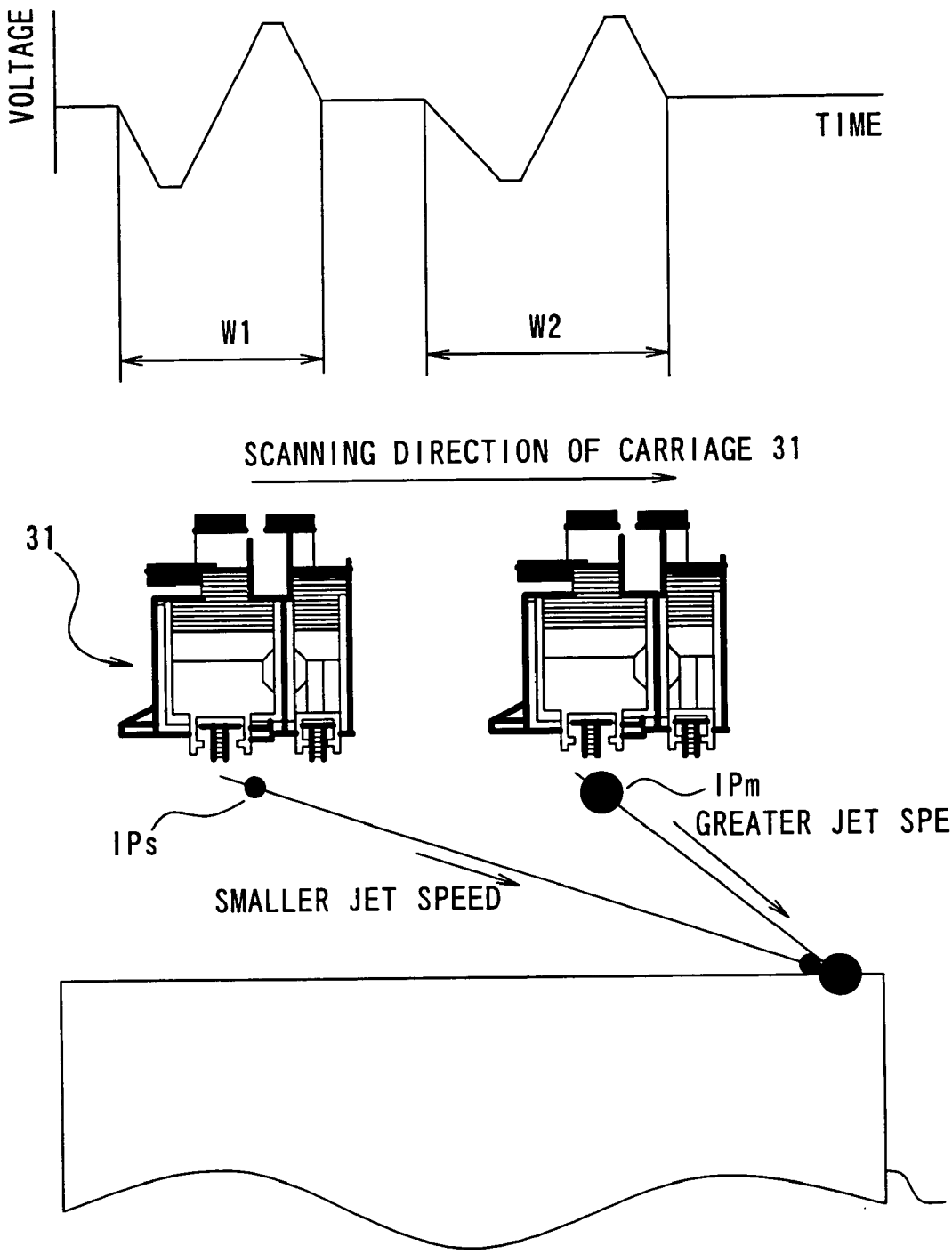
FIG. 9 shows driving waveforms of nozzles in the printer 22 and dots created in response to the driving waveforms.

Based on the above principle, the dot diameter may be varied according to the driving waveform for driving the nozzle, that is, according to the rate of change in the time divisions d1 and d2 where the driving voltage applied to the piezoelectric element PE is lowered. This embodiment provides two different driving waveforms, that is, one for creating small dots having the smallest diameter and the other for creating medium dots having the intermediate diameter, based on the relationship between the driving waveform and the dot diameter. FIG. 9 shows driving waveforms used in this embodiment. A driving waveform W1 is used to create the small dots, whereas a driving waveform W2 is used to create the medium dots. These two driving waveforms enable two different types of dots having different dot diameters, that is, the small dot and the medium dot, to be created with the nozzles Nz of an identical diameter.

Large dots are created by using both the driving waveforms W1 and W2 shown in FIG. 9. The lower part of FIG. 9 shows the process of hitting an ink droplet IPs for the small dot and an ink droplet IPm for the medium dot ejected from the nozzle against the printing paper P. When both the small dot and the medium dot are created in response to the driving waveforms of FIG. 9, the ink droplet IPm for the medium dot has a higher jet speed due to a greater amount of change of the piezoelectric element PE. Namely there is a difference in jet speed between these two types of ink droplets. Regulation of the scanning speed of the carriage 31 in the main scanning direction and the timings for successively ejecting the ink droplet IPs for the small dot and the ink droplet IPm for the medium dot according to the distance between the carriage 31 and the printing paper P enables both the ink droplets to reach the printing paper P at substantially identical timing. In this manner, the embodiment creates a large dot having the greatest dot diam ter with the two driving waveforms shown in the upper part of FIG. 9.

Figure 10:
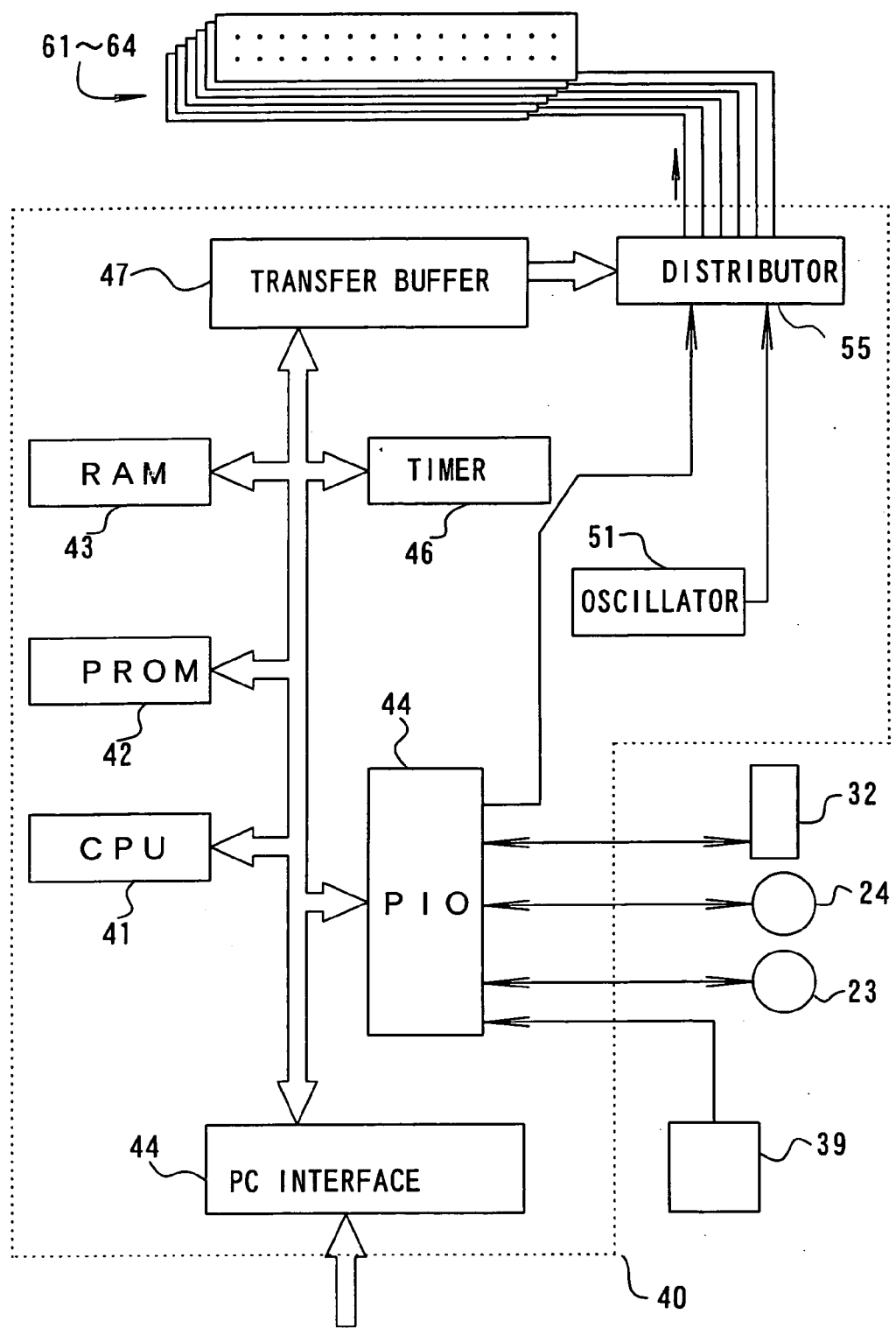
FIG. 10 is a block diagram schematically illustrating the internal structure of the printer 22.

The following describes the internal structure of the control circuit 40 in the printer 22 and the method of driving the print head 28 with the plurality of nozzles Nz arranged as shown in FIG. 7 in response to the driving waveforms discussed above. FIG. 10 illustrates the internal structure of the control circuit 40. The control circuit 40 includes a CPU 41, a PROM 42, a RAM 43, a PC interface 44 that transmits data to and from the computer 90, a peripheral equipment input-output unit (PIO) 45 that transmits signals to and from the peripheral equipment, such as the sheet feed motor 23, the carriage motor 24, and the control panel 32, a timer 46 that counts the time, and a transfer buffer 47 that outputs dot on-off signals to the ink spout heads 61 through 64. These elements and circuits are mutually connected via a bus. The control circuit 40 further includes an oscillator 51 that outputs driving waveforms at selected frequencies (see FIG. 9) and a distributor 55 that distributes the outputs from the oscillator 51 to the ink spout heads 61 through 64 at selected timings. The control circuit 40 receives dot data processed by the computer 90, temporarily stores the processed dot data in the RAM 43, and outputs the dot data to the transfer buffer 47 at a preset timing. In this embodiment, the printer 22 does not execute the image processing required for generating a multi-tone image. The control circuit 40 in the printer 22 accordingly carries out only the control operation to determine the on-off state of each dot that is, to determine whether or not a dot is to be created in each pixel.

Figure 11:
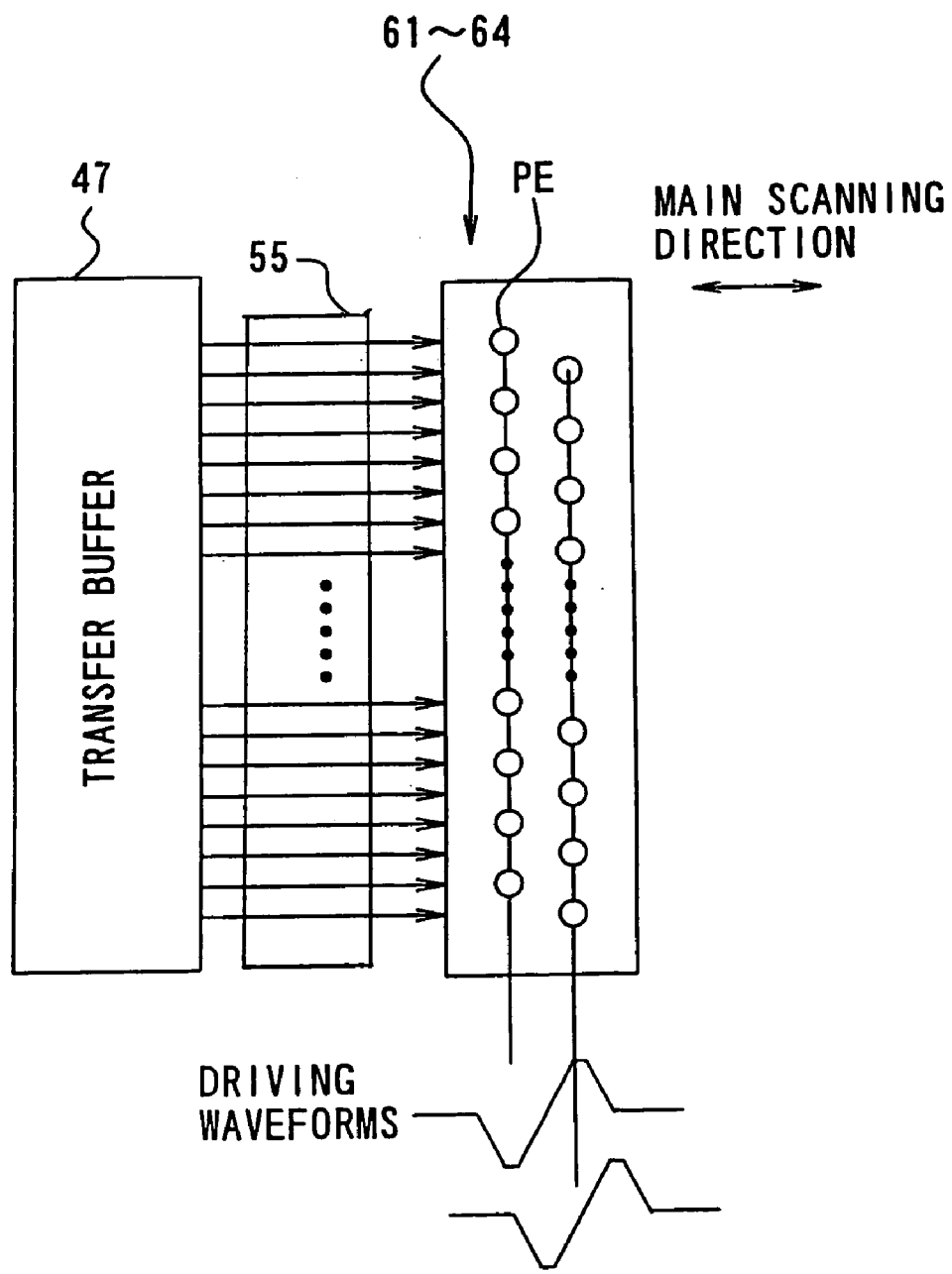
FIG. 11 shows a driving circuit structure of the print head.

The control circuit 40 outputs signals to the ink spout heads 61 through 64 in the form discussed belong. FIG. 11 shows a connection in one nozzle array on one of the ink spout heads 61 through 64. One nozzle array on one of the ink spout heads 61 through 64 is arranged in a circuit that includes the transfer buffer 47 as the source and the distributor 55 as the sink. The piezoelectric elements PE corresponding to the nozzles included in the nozzle array have one electrodes respectively connected to the output terminals of the transfer buffer 47 and the other electrodes collectively connected to the output terminal of the distributor 55. The driving waveforms of the oscillator 51 are output from the distributor 55 as shown in FIG. 11. When the CPU 41 outputs the dot on/off signals of the respective nozzles to the terminals of the transfer buffer 47, only the piezoelectric elements PE receiving the ON signal from the transfer buffer 47 are driven in response to the output driving waveforms. The ink particles Ip are thus ejected from the nozzles corresponding to the piezoelectric elements PE that have received the ON signal from the transfer buffer 47.

As illustrated in FIG. 9, the driving waveform W1 for the small dot and the driving waveform W2 for the medium dot are alternately output. When a small dot is to be created in a certain pixel, the ON signal is transferred to the nozzle array synchronously with the driving waveform W1 for the small dot while the OFF signal is transferred to the nozzle array synchronously with the driving waveform W2 for the medium dot. In order to create a medium dot in a certain pixel, on the other hand, the OFF signal is transferred to the nozzle array synchronously with the driving waveform W1 for the small dot while the ON signal is transferred to the nozzle array synchronously with the driving waveform W2 for the medium dot. In order to create a large dot in a certain pixel, the ON signal is transferred to the nozzle array synchronously with both the driving waveform W1 for the small dot and the driving waveform W2 for the medium dot. The printer 22 of this embodiment thus enables the dots having the greatest, the intermediate, and the smallest diameters to be created by each nozzle array in the course of one main scan.

The ink spout heads 61 through 64 are arranged in the moving direction of the carriage 31 as shown in FIG. 7, so that the respective nozzle arrays reach a specific position on the printing paper P at different timings. The CPU 41 outputs the dot on-off signals at required timings via the transfer buffer 47 to create the dots of the respective colors by taking into account the positional difference between the corresponding nozzles included in the ink spout heads 61 through 64. The CPU 41 also controls the output of the dot on-off signals by considering the two-line arrangement of each nozzle array on each of the ink spout heads 61 through 64.

The printer 22 of this embodiment may create three different types of dots, large, medium, and small, but uses only large and small dots in a dot creation process discussed below to attain the simplicity of the processing. All the three different types of dots may, however, be used in the dot creation process. One possible modification provides two driving waveforms for creating the two different types of dots, that is, the large dot and the small dot, and two oscillators for outputting these two driving waveforms, and selectively uses one of the driving waveforms corresponding to the diameter of the dots to be created.

In this embodiment, the printer 22 has the head that uses the piezoelectric elements PE to eject ink as discussed previously. The printer may, however, adopt another technique for ejecting ink. One alternative structure of the primer supplies electricity to a heater installed in an ink conduit and utilizes the bubbles generated in the ink conduit to eject ink. The principle of the present invention is applicable to a printer of this alternative structure since dots of different diameters can be created by varying the time period or the current of the supplying electricity.

(1) Dot Creation Routine in First Embodiment

Figure 12:
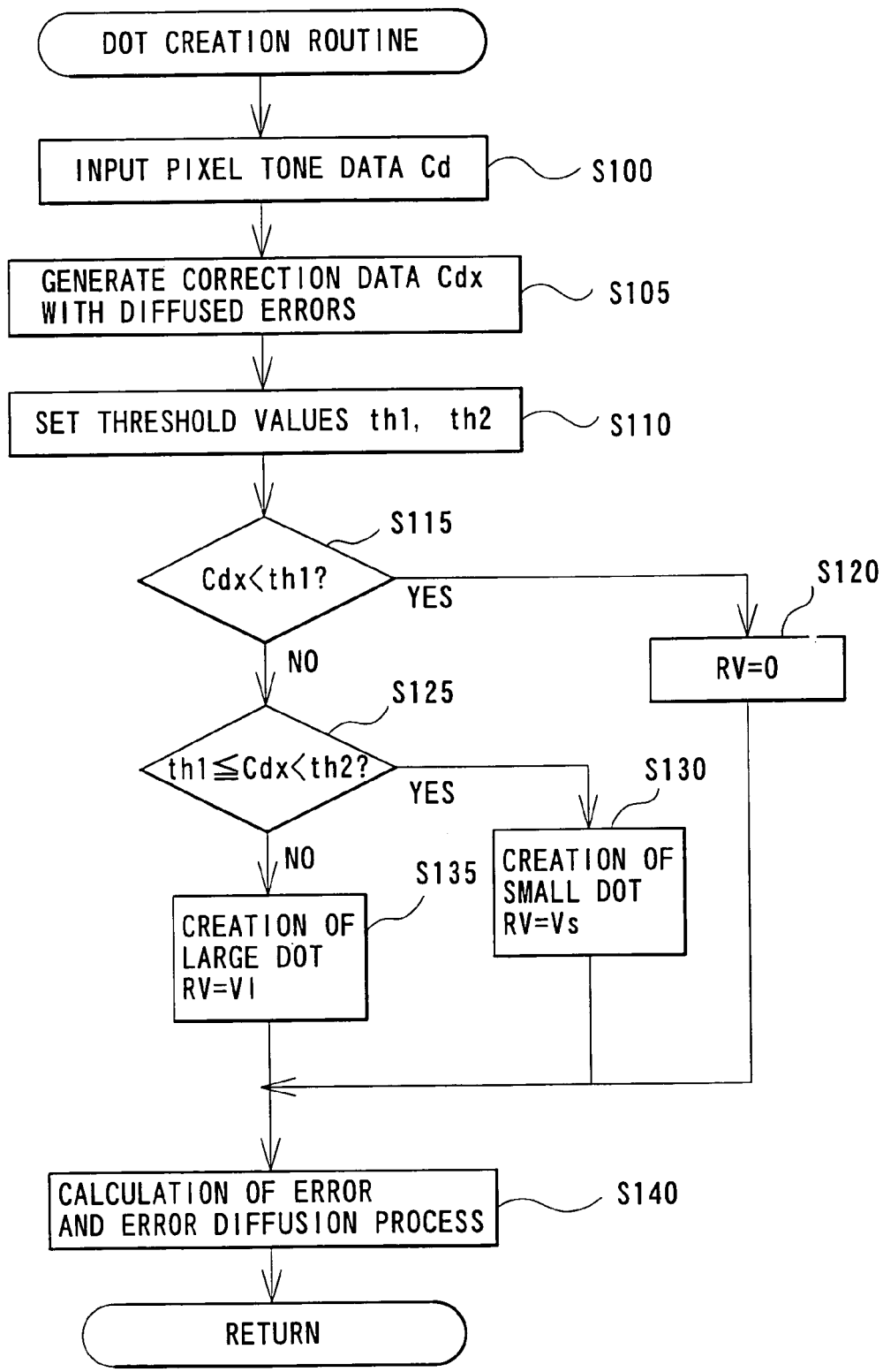
FIG. 12 is a flowchart showing a dot creation routine carried out in a first embodiment according to the present invention.

The flowchart of FIG. 12 shows a dot creation routine carried out in a first embodiment according to the present invention. This routine is part of the processing executed by the halftone module 99 in the printer driver 96, and is carried out by the CPU of the computer 90. As a matter of convenience, the following description regards the process of creating two different types of dots, large and small, with respect to only one color ink, i.e., cyan. The similar processing is, however, carried out for the other color inks.

When the program enters the dot creation routine of FIG. 12, the CPU first inputs pixel tone data Cd with respect to a target pixel at step S100. The pixel tone data Cd input here is obtained by converting an original color image into dot-unit image data of R, G, and B and causing the image data of R, G, and B to be subjected to color correction according to the ink colors C, M, and Y used by and the characteristics of the color development of the printer 22. In this embodiment, the pixel tone data Cd is 8-bit data that may take the tone value in the range of 0 to 255 with respect to each hue.

Figure 13:
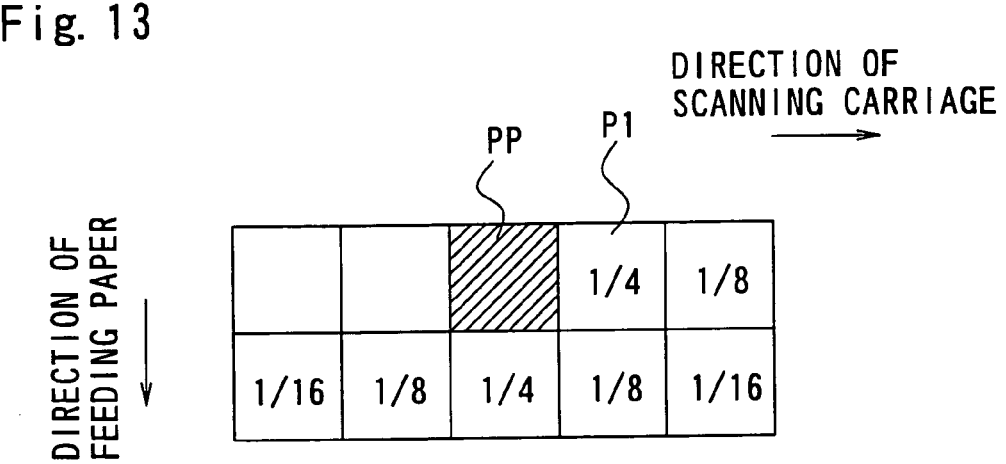
FIG. 13 shows en example of weights used in the error diffusion process.

The CPU adds diffused errors into the input pixel tone data Cd to generate correction data Cdx at step S105. The error diffusion method distributes a density error occurring in a certain processed pixel into peripheral pixels in the vicinity of the processed pixel with predetermined weights. The concrete procedure of step S105 reads the corresponding errors and adds the errors onto the input tone values for a target pixel being currently processed for printing. The table of FIG. 13 shows weights of error diffusion, with which an error occurring in a target pixel PP is distributed into the peripheral pixels in the vicinity of the target pixel PP. In the example of FIG. 13, the density error occurring in the target pixel PP is distributed into several peripheral pixels both in the scanning direction of the carriage 31 and in the feeding direction of the printing paper P with predetermined weights of $\frac{1}{4}$, $\frac{1}{8}$, and $\frac{1}{16}$. The details of the error diffusion process will be discussed later.

The CPU subsequently sets threshold values th1 and th2 at step S110. The concrete procedure of step S110 reads threshold values corresponding to the input pixel tone data Cd from a table, which has been stored in advance in the memory. The threshold value th1 relates to the determination of creation or non-creation of a small dot, whereas the threshold value th2 relates to the determination of creation or non-creation of a large dot. This embodiment is characterized by the settings of these threshold values, which will be discussed later in detail.

At subsequent step S115, the correction data Cdx is compared with the preset threshold value th1. In the case where the correction data Cdx is smaller than the threshold value th1, the density to be expressed with respect to the target pixel is lower than the density that requires creation of a small dot. The CPU accordingly determines non-creation of any dot and sets a value '0' to a resulting value RV at step S120.

In the case where the correction data Cdx is not smaller than the threshold value th1, on the other hand, the correction data Cdx is subsequently compared with the threshold value th2 at step S125. More concretely the CPU determines whether or not the correction data Cdx satisfies the relation of $th1 \leq Cdx \leq th2$. In the event that the correction data Cdx, is smaller than the threshold value th2, that is, $th1 \leq Cdx \leq th2$, the density to be expressed with respect to the target pixel is not lower than the density that requires creation of a small dot but is lower than the density that requires creation of a large dot. The CPU accordingly carries out the processing for creating a small dot and sets a density evaluation value Vs of the small dot to the resulting value RV at step S130. The processing for creating a small dot sets control data for selecting the driving waveform corresponding to creation of a small dot as data to be transferred to the printer 22.

In the event that the correction data Cdx is larger than the threshold value th2 (on the other hand, the density to be expressed with respect to the target pixel may be higher than the density that requires creation of a large dot), the CPU accordingly carries out the processing for creating a large dot and sets a density evaluation value V1 of the large dot to the resulting value RV at step S135.

The above procedure determines creation or non-creation of a dot and the type of the dot to be created in the target pixel, while setting the resulting value RV based or the result of determination. The CPU subsequently carries out calculation of an error ERR and the error diffusion process based on the resulting value RV at step S140.

The error ERR represents a difference between the correction data Cdx generated at step S105 and the density evaluation value RV of the dot actually created. While the correction data Cdx may continuously take the values in the range of 0 to 255, the density evaluation value RV that can be expressed by creation of a dot may take only the specific discrete values, 0, Vs, and V1. The error is ascribed to such difference. By way of example, a large dot may be created when the tone value of the correction data Cdx is equal to 199, while the density evaluation value RV of a large dot is equal to 255. There is accordingly a density error given as 255−199=56. This means that the density of the dot actually created is higher than the density to be expressed. The error ERR is thus obtained according to the equation of ERR=RV−Cdx.

The error diffusion process distributes the error thus obtained with respect to the target pixel PP, which is being currently processed, into the peripheral pixels in the vicinity of the target pixel PP with the predetermined weights (see the table of FIG. 13). Since the error should be distributed only into non-processed pixels, the peripheral pixels to which the error is distributed are the pixels arranged after the target pixel PP in the scanning direction of the carriage 31 or in the feeding direction of the printing paper P as shown in FIG. 13. In the above example, when the error ERR obtained for the target pixel PP, which is being currently processed, is equal to 56, the value '14', which is ¼ of the error ERR=56, is distributed into a pixel P1 adjacent to the target pixel PP. The division of the error '14' is made to reflect on the pixel tone data Cd of the pixel P1 at step S105 in the next cycle of this routine when the pixel P1 is set to a next target pixel. For example, when the pixel tone data Cd is equal to 214 with respect to the pixel P1, the process subtracts the diffused error '14' from the data Cd to generate the correction data Cdx equal to 200 at step S105. The repeated execution of such processing enables a resulting printed image to have the tones corresponding to the input image data as a whole, although each pixel has some density error. The weights and the range of error diffusion shown in the table of FIG. 13 are only illustrative and not restrictive in any sense, and any other weights and range may be applied according to the requirements.

The CPU carries out the processing to cause the printer 22 to create the required dots based on the result of the dot creation routine. There are a variety of known processes applicable for creation of dots according to the structure of the printer, and the details of the processing are not specifically described here.

Figure 14:
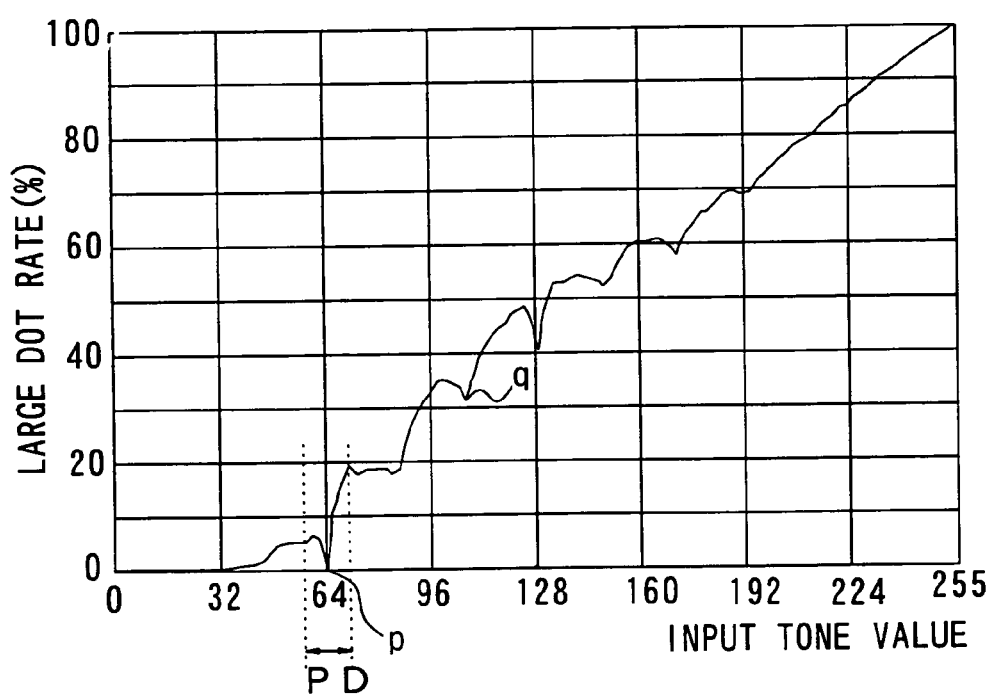
FIG. 14 is a graph showing a variation in large dot ratio in the case of fixed threshold values.

The following describes the settings of the threshold values th1 and th2 at step S110 in the flowchart of FIG. 12. The graph of FIG. 14 shows a creation ratio of the large dot in the case where the threshold values th1 and th2 are set to fixed values. More concretely, the graph of FIG. 14 shows the creation ratio of the large dots plotted against the input tone value when the threshold value th1 is set equal to 63, the threshold value th2 to 93, the density evaluation value Vs of a small dot to 128, and the density evaluation value V1 of a large dot to 255. The creation ratio of the large dot shown in FIG. 14 does not denote the ratio of the number of large dots to the number of small dots to be created, but represents a proportion based on the density expressed by large dots. The creation ratio of the large dot according to this definition is hereinafter referred to as the large dot ratio and expressed by the equation given below:

$$\text{Large dot ratio} = N1 \times V1 / (N1 \times V1 + Ns \times Vs)$$

where N1 and Ns respectively denote the number of large dots and the number of small dots created in a specific area, and V1 and Vs represent the density evaluation values of a large dot and a small dot.

As clearly understood from the above equation, the large dot ratio represents the creation ratio of the density expressed by large dots to the total sum density of large and small dots. This parameter is used because the large dot ratio significantly affects the harshness of a resulting image. The large dots have a higher visual recognition than small dots do, and a higher large dot ratio at an identical tone value results in the greater degree of harshness in the resulting image. As shown in the graph of FIG. 14, when the three-valuing process is carried out with the fixed threshold values th1 and th2, the large dot ratio abruptly changes at some points, for example, points p and q. This results in an abrupt change of the harshness and may cause creation of a quasi contour in an area about such a point.

Figure 15:
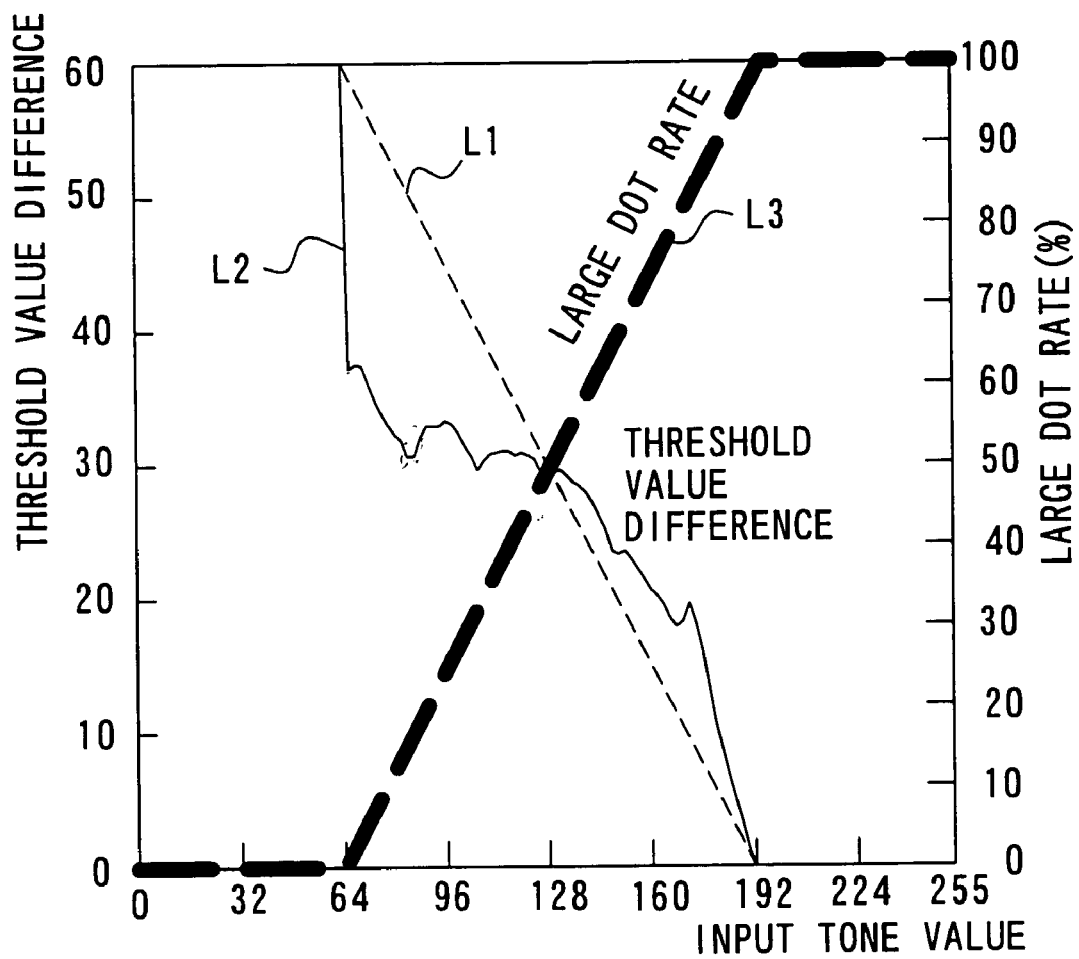
FIG. 15 is a graph showing the settings of large dot ratio and threshold value difference.

The procedure of the embodiment takes into account the above fact and sets a desired curve of large dot ratio against the input tone value as a bold broken line L3 in the graph of FIG. 15. In the area where the input tone value is not greater than 63, the large dot ratio is set equal to 0%. In the area where the input tone value is not less than 191, the large dot ratio is set equal to 100%. In the intermediate area the large dot ratio is set to linearly increase. The large dot ratio may be set to have significant values not in a specific range of tone values but over the whole range of tone values. The increase in large dot ratio may be defined by a curve, instead of the straight line as shown in the graph of FIG. 15.

The procedure of this embodiment sets the threshold values th1 and th2 corresponding to the input tone value, in order to attain the large dot ratio thus determined. It has been proved experimentally that the large dot ratio is effected not by the absolute values of the threshold values t1 and th2 but by a difference between the threshold values th2−th1 (hereinafter referred to as the threshold value difference). The CPU accordingly sets the threshold value difference as shown in the graph of FIG. 15.

The following method is applied to set the threshold value difference. The process first sets a certain curve of threshold value difference as the first approximate setting and calculates large dot ratios corresponding to a variety of tone values based on this curve of threshold value difference. The threshold value differences at the tone values having the calculated large dot ratios that do not coincide with the desired curve of large dot ratio shown in FIG. 15 are corrected according to the results of the calculation. This computation is repeated to refine the approximate setting consecutively.

The concrete process carried out in this embodiment is discussed below. In the area where the input tone value is not less than 191, the large dot ratio is set equal to 100%. It is accordingly required to set the threshold value difference equal to zero in this area, in order to eliminate the range of $th1 \leq Cdx < th2$ where small dots are to be created. In the area where the input tone value is not greater than 63, the large dot ratio is set equal to 0%. It is accordingly required to set a sufficiently large value to the threshold value difference in this area. A broken line L1 connecting with these two values 0 and 60 was specified as the first approximate setting of the threshold value difference as shown in FIG. 15.

The results of calculation of the large dot ratio based on the first approximate setting are not specifically given here, but still resulted in a plurality of extreme points similar to that shown in the graph of FIG. 14. At the tone value where the calculated large dot ratio was greater than the desired large dot ratio shown in FIG. 15, the threshold value difference was corrected to a value of second approximate setting that was a little greater than the first approximate setting. At the tone value where the calculated large dot ratio was smaller than the desired large dot ratio, on the other hand, the threshold value difference was corrected to a value of second approximate setting that was a little smaller than the first approximate setting. The process of the embodiment set the amount of correction corresponding to the difference between the calculated large dot ratio and the desired large dot ratio shown in FIG. 15. It is noted, however, that the large dot ratio does not precisely correspond to the difference.

The curve of large dot ratio was calculated again based on the second approximate setting. Although the calculated curve of large dot ratio based on the second approximate setting was closer to the desired curve of large dot ratio than the calculated curve of large dot ratio based on the first approximate setting, there were still some extreme points. The process of correcting the threshold value differences and re-calculating the large dot ratios was repeated many times to consecutively refine the curve of threshold value difference, in order to attain the desired curve of large dot ratio. The curve L2 shown in FIG. 15 represents a resulting curve of threshold value difference eventually obtained. The resulting curve L2 of threshold value difference has a plurality of turning values and points of extreme change where the linear differential coefficient is discontinuous.

Figure 16:
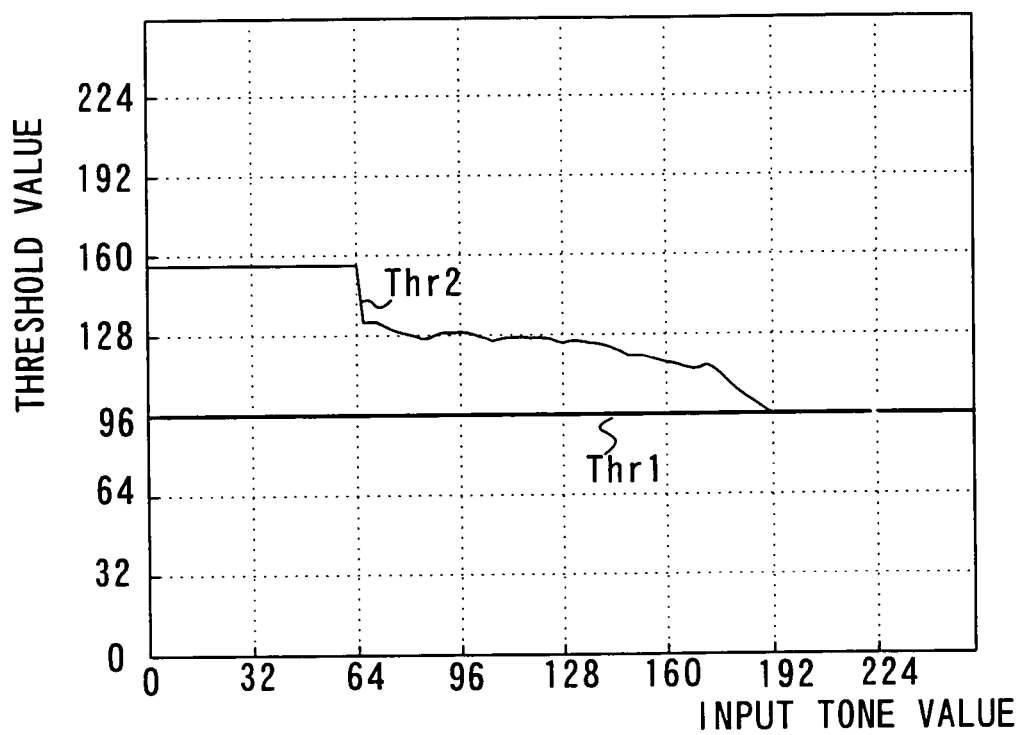
FIG. 16 is a graph showing a first example of possible settings for the threshold values th1 and th2.

Concrete values are set to the threshold values th1 and th2, based on the refined curve of threshold value difference thus obtained. In this embodiment, the threshold value th1 is set to a fixed value as a simplest pattern, whereas the threshold value th2 is set in a state having a plurality of turning values according to the settings of FIG. 15. The results of the settings are shown in FIG. 16. The process of this embodiment stores the threshold values set in the above manner in the form of a table in the memory. The CPU reads the threshold values corresponding to the correction data Cdx from this table and carries out the multi-valuing operation in the dot creation process shown in the flowchart of FIG. 12.

Figure 17:
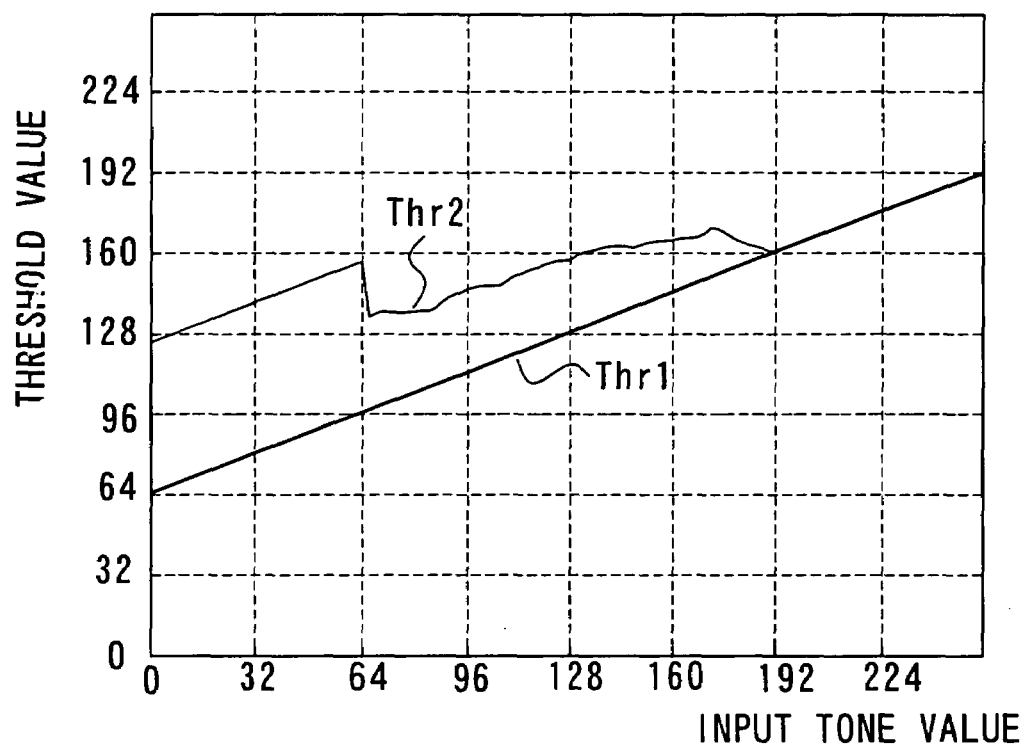
FIG. 17 is a graph showing a second example of possible settings for the threshold values th1 and th2.
Figure 18:
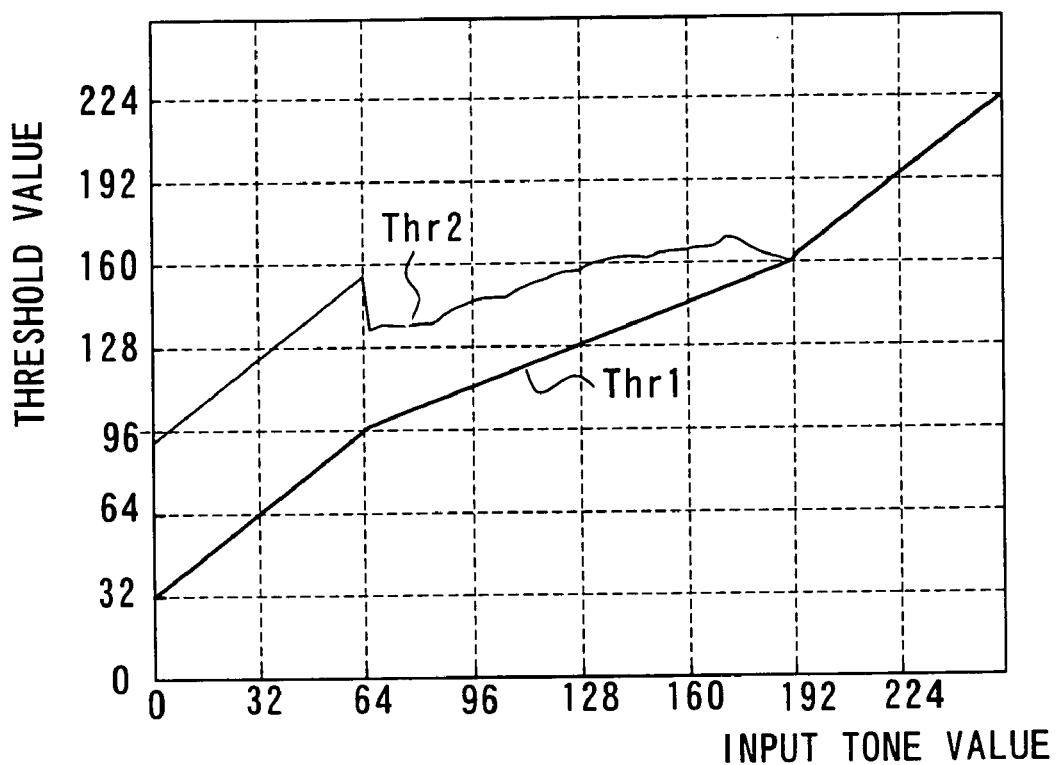
FIG. 18 is a graph showing a third example of possible settings for the threshold values th1 and th2.
Figure 19:
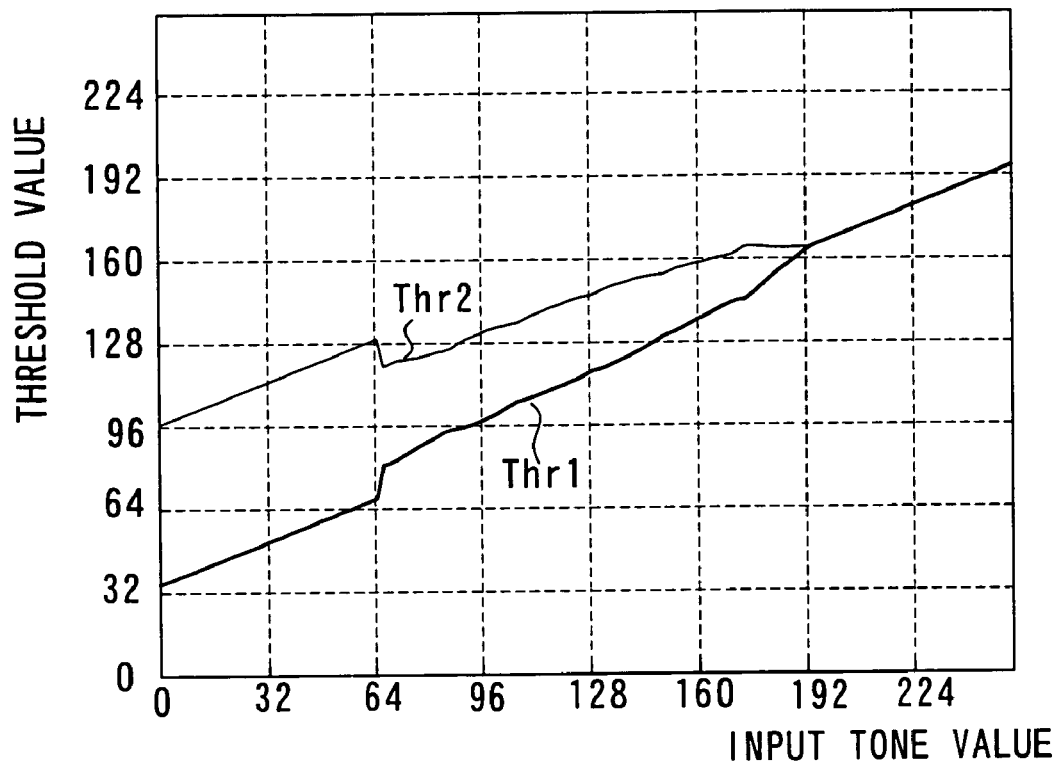
FIG. 19 is a graph showing a fourth example of possible settings for the threshold values th1 and th2.

FIG. 17 shows other possible settings of the threshold values th1 and th2, where the threshold value th1 linearly increases and the threshold value th2 changes based on the settings of FIG. 15. In still other possible settings of FIG. 18, the threshold value th1 is defined by a broken line, whereas the threshold value th2 is the same as the setting of FIG. 17. In other possible setting of FIG. 19, both the threshold values th1 and th2 vary in a complicated manner. In the settings of FIG. 19, the straight line given as the graph of threshold value th1 in FIG. 17 is used as a reference curve. The graph of threshold value th2 is obtained by adding half the resulting curve of threshold value difference shown in FIG. 15 to the reference curve. The graph of threshold value th1 is obtained by subtracting half the resulting curve of threshold value difference from the reference curve. The graphs of threshold values th1 and th2 may alternatively be given as smooth curves, although not specifically illustrated here.

The printer-system of this embodiment can regulate the creation ratios of the large dot and the small dot, in order to attain the desired curve of large dot ratio against the input tone value. Especially the process of this embodiment ensures the regulation to change the creation ratio of these dots in a substantially regular manner according to the settings of FIG. 15. As mentioned previously, the large dot ratio significantly affects the harshness of a resulting printed image. When the large dot ratio abruptly changes at a certain tone value, the picture quality significantly changes and a quasi contour may be generated at the certain tone value. The printer of this embodiment regulates the large dot ratio to a desired state, thereby preventing the generation of a quasi contour and improving the picture quality of the resulting printed image.

(2) Dot Creation Routine in Second Embodiment

A dot generation routine executed in a second embodiment according to the present invention is described below with the flowchart of FIG. 20. Like the dot creation routine of the first embodiment, the dot creation routine of the second embodiment is carried out by the CPU of the computer 90. As a matter of convenience, the following description regards the process of creating two different types of dots, large and small, with respect to only one color ink, i.e., cyan. The similar processing is, however, carried out for the other color inks.

Figure 20:
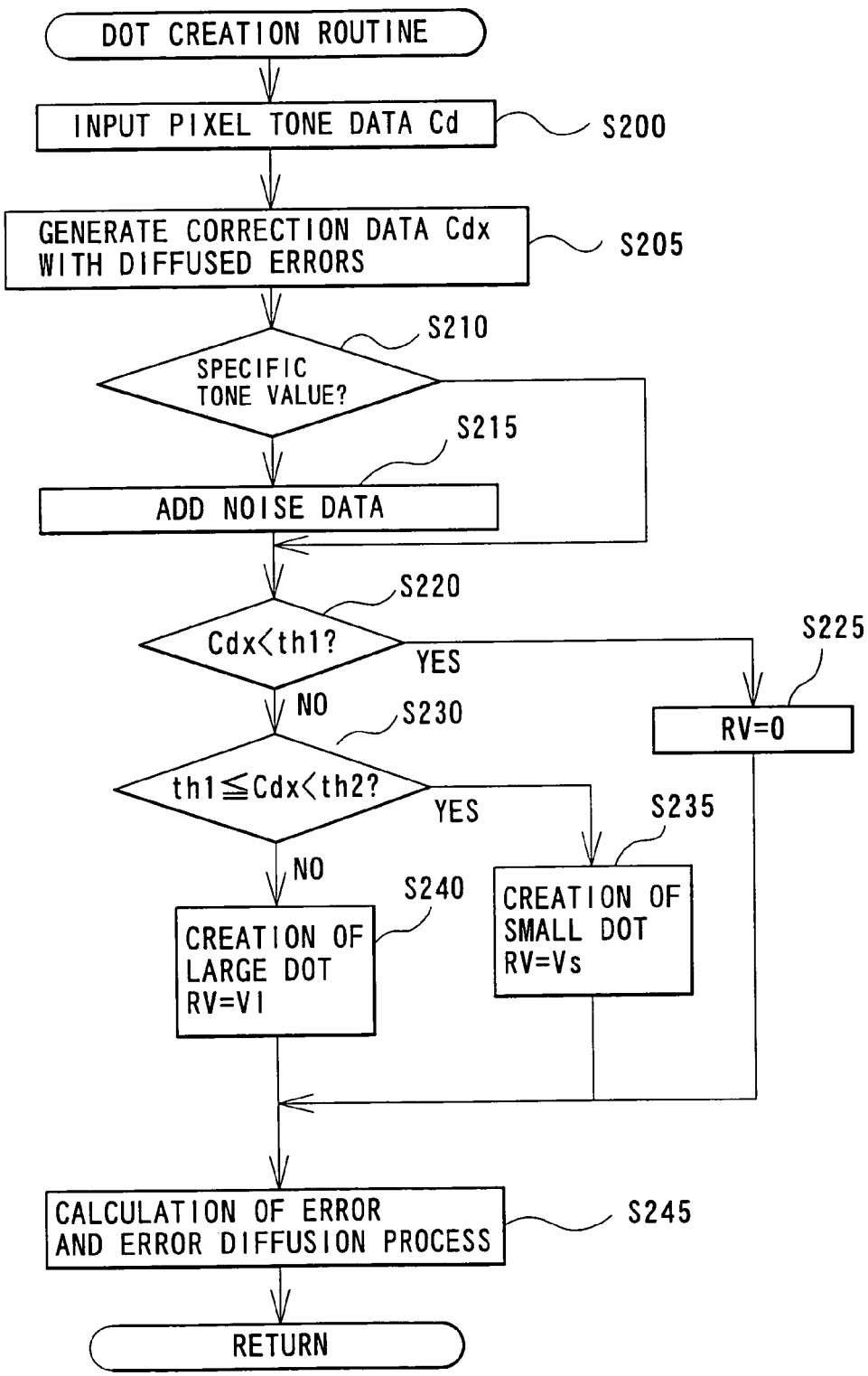
FIG. 20 is a flowchart showing a dot creation routine carried out in a second embodiment according to the present invention.

When the program enters the dot creation routine of FIG. 20, the CPU first inputs pixel tone data Cd with respect to a target pixel at step S200, and performs error diffusion processing to distribute error in the input pixel tone data Cd to unprocessed pixels, thereby to generate correction data Cdx at step S205. Like the first embodiment, the pixel tone data Cd input here is 8-bit data that may take the tone value in the range of 0 to 255 with respect to each hue. The correction for the diffused errors is implemented by the method described in the first embodiment.

The CPU then determines whether or not the correction data Cdx corresponds to any one of specific tone values at step S210. The specific tone values here represent the tone values at which the large dot ratio abruptly changes in the multi-valuing process according to the error diffusion method using fixed threshold values, for example, the points p and q in the graph of FIG. 14. The specific tone values have been experimentally set in advance and stored in the ROM.

In the case where the correction data Cdx corresponds to any one of such specific tone values, the CPU adds preset noise data to the correction data Cdx at step S215. The specific tone values are unstable tone values at which the large dot ratio abruptly changes. Th addition of the noise data prevents the determination at such unstable tone values for creation or non-creation of dots. In the case where the correction data Cdx does not correspond to any one of the specific tone values, the processing of step S215 is skipped.

The noise data added to the correction data Cdx has a mean value equal to zero, in order to prevent the occurrence of an error with respect to the tone to be expressed. A variety of data can satisfy this condition. For example, random numbers in the range of −10 to 10 may be used for the noise data. One possible modification of the processing at step S210 determines whether or not the correction data Cdx coincides with any one of the specific tone values (for example, the tone value p in the graph of FIG. 14) and also whether or not the correction data Cdx is present in a certain range including the specific tone value (for example, a range PD in FIG. 14). The certain range is experimentally set to ensure the favorable picture quality according to the size of the noise data.

After the setting of the correction data Cdx, the CPU compares the correction data Cdx with a threshold value th1 at step S220. In the event that the correction data Cdx is smaller than the threshold value th1, a value '0' is set to the resulting value RV at step S225. In the first embodiment, the threshold value th1 is varied according to the correction data Cdx. In the second embodiment, however, the threshold value th1 is set to a fixed value, irrespective of the value of the correction data Cdx. The threshold value th1 may be set arbitrarily but is set equal to, for example, half the density evaluation value Vs of the small dot.

In the event that the correction data Cdx is not smaller than the threshold value th1, the correction data Cdx is then compared with a threshold value th2 at step S230. When the correction data Cdx is smaller than the threshold value th2, the CPU determines that a small dot is to be created, carries out the processing for creation of a small dot, and sets the density evaluation value Vs of the small dot to the resulting value RV at step S235. Unlike the first embodiment, the threshold value th2 is set to a fixed value, irrespective of the value of the correction data Cdx. The threshold value th2 may be set arbitrarily, as long as it is not smaller than the threshold value th1. For example, a mean value of the density evaluation value Vs of the small dot and the density evaluation value Vl of the large dot may be set to the threshold value th2.

When the correction data Cdx is not smaller than the threshold value th2, on the other hand, the CPU determines that a large dot is to be created, carries out the processing for creation of a large dot, and sets the density evaluation value Vl of the large dot to the resulting value RV at step S240. The above procedure determines creation or non-creation of a dot and sets the resulting value RV. The CPU carries out calculation of an error and the error diffusion process based on the preset resulting value RV at step S245. The details of the calculation of the error and the error diffusion process are identical with those of the first embodiment.

The printer-system of the second embodiment adds the noise data to the correction data Cdx under certain conditions and prevents the determination regarding the dot creation at the specific tone values. This arrangement effectively prevents the large dot ratio from abruptly changing. While the second embodiment does not completely regulate the large dot ratio to a desired state, this arrangement significantly reduces the occurrence of a quasi contour and improves the picture quality of the resulting printed image. Another advantage of the second embodiment is non-requirement for experimentally setting the threshold values against the respective tone values in advance, which is required in the first embodiment. The second embodiment thus enables an improvement in picture quality of the resulting printed image by the relatively simple process.

In the second embodiment, the noise data is added to the correction data Cdx only when the correction data Cdx corresponds to any one of the specific tone values. One possible modification of the second embodiment adds greater noise data to the correction data Cdx, which corresponds to any one of the specific tone values, while carrying out the addition of some noise data in all cases. This modified structure relieves the change of the large dot ratio) not only at the specific tone values, where the large dot ratio abruptly changes, such as the tone values p and q shown in FIG. 14, but at the other tone values. This ensures a further improvement in picture quality of the resulting printed image.

Another possible application of the present invention is a combination of the two embodiments discussed above. The method of the first embodiment using the threshold values that are experimentally set to ensure a relatively smooth variation in large dot ratio as discussed above with the graph of FIG. 15 is applied for the specific tone values, such as the tone values p and q in FIG. 14, at which the large dot ratio abruptly changes in the multi-valuing process according to the error diffusion method using the fixed threshold values. The fixed threshold values are, on the other hand, applied for the other tone values. The modified procedure adds the noise data to the correction data Cdx at all the tone values. This modified procedure is simpler than the process of the first embodiment, which experimentally sets the threshold values against all the tone values, and ensures the better picture quality than the process of the second embodiment that simply adds the noise data to the correction data Cdx.

The above two embodiments regard the processing carried out for each pixel and each color. One practical application repeats the processing for each raster line or the whole image while storing the results obtained for the respective pixels in the memory.

The above embodiments regard the case in which the three-valuing process is carried out with respect to the two different types of dots, that is, the large dot and the small dot. The principle of the present invention is applicable to another three-valuing process. For example, in a printer with a head that provides two different inks of different densities, that is, a higher-density ink and a lower-density ink, with respect to a certain hue, the method of the present invention is applied to regulate the creation ratio of dots with these two different inks. The principle of the present invention is not restricted to the three-valuing process but is applicable to any multi-valuing process, for example, the multi-valuing process with respect to three or a greater number of different types of dots having different dot diameters or the multi-valuing process with respect to a plurality of different types of dots having different diameters, which are respectively created with two different inks of different densities. In this case, the method of the present invention may regulate the creation ratio of all the different types of dots or the creation ratio of only one or part of the available dots. It is desirable to regulate the creation ratio of at least one dot that most significantly affects the picture quality, that is, the dot having the highest density per unit area.

In the embodiments discussed above, the large dot ratio that represents the ratio of the density expressed by large dots to the total density of large and small dots is used as the parameter representing the creation ratio of dots. A variety of other parameters that represent the visual effects on the resulting image may be used for the same purpose. For example, a proportion based on the numbers of the respective dots having different dot diameters to be created may be used as the parameter.

The printing systems of the above two embodiments include a variety of processes executed by the computer. One possible application of the present invention is thereby a recording medium, in which a program for actualizing the respective functions discussed above is stored. Typical examples of the recording media include flexible disks, CD-ROMs, magneto-optic discs, IC cards, ROM cartridges, punched cards, prints with bar-codes or other codes printed thereon, internal storage devices (memories like a RAM and a ROM) and external storage devices of the computer, and a variety of other computer readable media. Still another application of the invention is a program supply apparatus that supplies a computer program, which causes the computer to carry out the respective steps of the method or the functions of the respective units, to the computer via a communications path. Any one or part of the processes described above may be implemented by the hardware configuration.

The present invention is not restricted to the above embodiments or their modifications, but there may be many other modifications, changes, and alterations without departing from the scope or spirit of the main characteristics of the present invention. In the illustrated embodiments, the variety of processes are executed by the computer 90. In accordance with one alternative application, however, the printer 22 may have the functions of executing such processes and actually carry out the processing.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of United States is:

1. A printer-system that creates a plurality of dots and thereby prints an image on a printing medium, said printer-system comprising:
    a head configured to produce N different dots having different densities per unit area, where N is an integer of not less than 2;
    an input unit configured to input tone data with respect to each of the pixels included in an original image;
    a threshold value storage unit configured to store a plurality of threshold values according to possible tone values that the input tone data may take, the threshold values including respective threshold values that correspond to P different dots, where P is an integer satisfying $2 \leq P \leq N$;
    a multi-valuing unit configured to determine an on-off state of a dot and which of the N different dots is to be created in each pixel based on density data obtained by an error diffusion distribution of an error, said error representing a difference between a density to be expressed in a processed pixel and a density expressed by a dot actually created in the pixel; and
    a dot creation unit configured to drive said head and create the N different dots having different densities per unit area based on results of the determination.

2. A printer-system in accordance with claim 1, wherein the corresponding threshold values are set to cause a creation ratio of the P different dots to smoothly change against the input tone value.

3. A printer-system in accordance with claim 2, wherein the creation ratio represents a ratio of a density expressed by a specific dot, which is selected out of P different dots and created in a certain tone range, to a density to be expressed by the input tone data.

4. A printer-system in accordance with claim 1, wherein at least two of the corresponding threshold values are set to an identical value in a specified input tone range.

5. A printer-system in accordance with claim 1, wherein the threshold value storage unit is configured to determine a difference between corresponding threshold values according to the input tone value, said difference having a plurality of points where a linear differential coefficient of the difference changes from minus to plus or plus to minus.

6. A printer-system in accordance with claim 1, wherein said head enables creation of two different dots having different ink quantities and the corresponding threshold values include a greater threshold value and a smaller threshold value.

7. A printer-system in accordance with claim 2, wherein the creation ratio takes significant values only in a continuous tone range, which is part of the possible tone values that the input tone data may take.

8. A printer-system is accordance with claim 7, wherein the creation ratio in a lower limit of the continuous tone range is set to be different from a specific tone value, at which the creation ratio of the P different dots abruptly changes when the correspondence threshold values are set to fixed values irrespective of the tone value.

9. A printer-system that creates a plurality of dots and thereby prints an image on a printing medium, said printer-system comprising:
    a head configured to produce N different dots having different densities per unit area, where N is an integer of not less than 2;
    an input unit configured to input tone data with respect to each of the pixels included in an original image;
    a multi-valuing unit configured to determine an on-off state of a dot and which of the N different dots is to be created in each pixel based on density data obtained by an error diffusion distribution of an error, said error representing a difference between a density to be expressed in a processed pixel and a density expressed by a dot actually created in the pixel;
    a dot creation unit configured to drive said head and create the N different dots having different densities per unit area based on results of the determination; and
    a noise addition unit that adds preset noise data to either one of the input tone data and at least a part of a plurality of threshold values for tone values of said input tone data, prior to the determination by said multi-valuing unit.

10. A printer-system in accordance with claim 9, wherein said noise addition unit adds the preset noise data only when the input tone data coincides with a predetermined tone value, and wherein the predetermined tone value used in said noise addition unit is set equal to a specific tone value, at which a creation ratio of P different dots abruptly changes, where P is an integer satisfying $2 \leq P \leq N$.

11. A printer-system in accordance with claim 9, wherein said noise addition unit adds first noise data to either one of the input tone data and at least part of the plurality of threshold values, prior to the determination by said multi-valuing, said noise addition unit adds second noise data which has a greater absolute value than the first noise data, instead of the first noise data when the input tone value coincides with a predetermined tone value.

12. A method of creating a plurality of dots and printing an image on a printing medium with a head that enables creation of N different dots having different densities per unit area, where N is an integer of not less than 2, said method comprising steps of:
    (a) inputting tone data with respect to each of pixels included in an original image;

(b) referring to data that stores a plurality of threshold values according to possible tone values that the input tone data may take and determining the plurality of threshold values corresponding to the input tone data, the plurality of threshold values including corresponding threshold values that correspond to P different dots, where P is an integer satisfying $2 \leq P \leq N$;

(c) determining an on-off state of a dot and which of the N different dots is to be created in each pixel based on density data obtained by error diffusion distribution of an error, said error representing a difference between a density to be expressed in a processed pixel and a density expressed by a dot actually created in the pixel;

(d) driving said head and creating the N different dots having different densities per unit area based on results of the determination carried out in said step (b); and (e) driving said head and creating the N different dots having different densities per unit area, based on results of the determination carried out in said step (c).

13. A method of creating a plurality of dots and printing an image on a printing medium with a head that enables creation of N different dots having different densities per unit area, where N is an integer of not less than 2, said method comprising the steps of:

(a) inputting tone data with respect to each of pixels included in an original image;

(b) determining an on-off state of a dot and which of the N different dots is to be created in each pixel based on density data obtained by error diffusion distribution of an error, said error representing a difference between a density to be expressed in a processed pixel and a density expressed by a dot actually created in the pixel;

(c) driving said head and creating the N different dots having different densities per unit area based on results of the determination carried out in said step (b); and (d) adding preset noise data to either one of the input tone data and at least a part of a plurality of threshold values for tone values of said input tone data, prior to the determination carried out in said step (b).

14. A recording medium in which a program for driving a printer is recorded in a computer readable manner, said printer creating a plurality of dots and thereby printing an image on a printing medium, said program causing a computer to attain the functions of:

referring to data, which stores a plurality of threshold values according to possible tone values that input tone data may take, and determining the plurality of threshold values corresponding to the input tone data, the plurality of threshold values including corresponding threshold values that correspond to at least two different dots having different densities per unit area; and determining an on-off state of a dot and which of the N different dots is to be created in each pixel based on density data obtained by error diffusion distribution of an error, said error representing a difference between a density to be expressed in a processed pixel and a density expressed by a dot actually created in the pixel.

15. A recording medium in which a program for driving a printer is recorded in a computer readable manner, said printer creating a plurality of dots and thereby printing an image on a priming medium, said program causing a computer to attain the functions of:

determining an on-off state of a dot and which dot is to be created in each pixel based on density data obtained by error diffusion distribution of an error, said error representing a difference between a density to be expressed in a processed pixel and a density expressed by a dot actually created in the pixel; and adding preset noise data to either one of input tone data and at least a part of a plurality of threshold values for tone values of said input tone data, prior to the determination.

* * * * *